US007599866B2

(12) United States Patent
Yan et al.

(10) Patent No.: US 7,599,866 B2
(45) Date of Patent: Oct. 6, 2009

(54) SIMULTANEOUS OPTIMAL AUCTIONS USING AUGMENTED LAGRANGIAN AND SURROGATE OPTIMIZATION

(75) Inventors: Joseph H. Yan, Arcadia, CA (US); Peter B. Luh, Storrs, CT (US); Gary A. Stern, Monrovia, CA (US); William E. Blankson, Columbia, CT (US); Ernan Ni, Berlin, CT (US); Ying Chen, Coventry, CT (US); Feng Zhao, Storrs, CT (US); Yaming Ma, Ashford, CT (US)

(73) Assignees: Southern California Edison Company, Rosemead, CA (US); The University of Connecticut, Farmington, CT (US)

( * ) Notice: Subject to any disclaimer, the term of this patent is extended or adjusted under 35 U.S.C. 154(b) by 891 days.

(21) Appl. No.: 10/746,970

(22) Filed: Dec. 23, 2003

(65) Prior Publication Data
US 2005/0137959 A1   Jun. 23, 2005

Related U.S. Application Data

(60) Provisional application No. 60/513,943, filed on Oct. 24, 2003.

(51) Int. Cl.
*G06Q 40/00* (2006.01)
(52) U.S. Cl. .......................................... 705/35; 705/37
(58) Field of Classification Search .................... 705/35
See application file for complete search history.

(56) References Cited

U.S. PATENT DOCUMENTS

| 5,406,289 | A | 4/1995 | Barker et al. ................... 342/96 |
| 5,486,995 | A | 1/1996 | Krist et al. ................... 364/149 |
| 5,537,119 | A | 7/1996 | Poore, Jr. ...................... 342/96 |
| 5,715,165 | A | 2/1998 | Luh et al. ............... 364/474.15 |
| 5,886,908 | A | 3/1999 | Conn et al. ................... 364/578 |
| 5,959,574 | A | 9/1999 | Poore, Jr. ...................... 342/96 |
| 6,266,655 | B1 | 7/2001 | Kalyan ...................... 705/400 |
| 6,374,227 | B1 | 4/2002 | Ye ................................ 705/8 |
| 6,404,380 | B2 | 6/2002 | Poore, Jr. ...................... 342/96 |
| 2003/0065689 | A1 | 4/2003 | Asai et al. ....................... 708/3 |
| 2003/0110066 | A1 | 6/2003 | Walser et al. ................... 705/7 |

OTHER PUBLICATIONS

"Optimizatino-Based Inter-Utility Power Purchases" Lan Zhang, Peter Luh, Xiaohong Guan IEEE Transactions on Power Systems vol. 9 May 1994.*
Bertsekas, D.P., et al., "Optimal Short-Term Scheduling of Large-Scale Power Systems", IEEE Trans. Automatic Control, 1983, AC-28(1), at 1-11.

(Continued)

*Primary Examiner*—James A Kramer
*Assistant Examiner*—James A Vezeris
(74) *Attorney, Agent, or Firm*—Sheldon Mak Rose & Anderson PC; Robert J. Rose

(57) ABSTRACT

A method for determining a market clearing price ("MCP") in an electricity market, in which an objective function relates the MCP and constraints in terms of a nonlinear programming expression, and the MCP is found by resolving an augmented Lagrangian dual function using a surrogate optimization framework. A system is also provided.

12 Claims, 5 Drawing Sheets

OTHER PUBLICATIONS

Bertsekas, D.P., et al., "Parallel and Distributed Computation: Numerical Methods", 1997, Book.

Borenstein, S., et al., "Measuring Market Inefficiencies in California's Restructured Wholes Electricity Market", University of California Energy Institute, Center for the Study of Enery Markets, The American Econmic Review, Dec. 2002, pp. 1376-1405.

California Independent System Operator (CAISO), Market Design 2002 Project, "Comprehensive Design Proposal Appendix A", Apr. 19, 2002.

California Independent System Operator (CAISO), MD02 Tariff Filings, Attachment A, Appendix K: "Locational Marginal Pricing", filed with FERC on Jun. 27, 2002.

Cohen, A., et al., "Security Constrained Unit Commitment for Open Markets", Proc. 1999 IEEE Power Ind. Comput.Appl. Conf., Jul. 1999, at 39-44.

Cohen, G., et al., "Decomposition Coordination Methods in Large Scale Optimization Problems: The Nondifferentiable Case and the Use of Augmented Lagrangians", Advances in Large Scale Systems; vol. 1, pp. 203-266, 1984.

Dekrajangpetch, S., et al., "Auction Implementation Problems Using Lagrangian Relaxation", IEEE Trans. on Power Systems 1999, 14(1):82-88.

Federal Energy Regulatory Commission Order, "Order Proposing Remedies for California Wholesale Electricity Markets", Issued Nov. 1, 2000.

Federal Energy Regulatory Commission Order, "Working Paper on Standardized Transmission Service and Wholesale Electric Market Design", Mar. 15, 2002.

Guan, X, et al., "An Optimization Based Algorithm for Scheduing Hydrothermal Power Systems with Cascaded Reservoirs and Discrete Hydro Contrants", IEEE Trans. on Power Systems, 1997, 12(4):1775-1780.

Joskow, Paul, et al., "A Quantitative Analysis of Pricing Behavior in California's Wholesale Electricity Market During Summer 2000: The Final Word", Feb. 4, 2002, pp. 1-42.

Kahn, A.E., et al., "Pricing in the California Power Exchange Electricity Market: Should California Switch from Uniform Pricing to Pay-as-Bid Pricing?", Blue Ribbon Panel Report, Jan. 2001.

Ma, H., et al., "Unit Commitment with Transmission Security and Voltage Constraints", Jun. 1998, PE-416-PWRS-2-06-1998, IEEE Transactions on Power Systems, 14(2).

Merlin, A., et al., "A New Method for Unit Commitment at Electricite de France", IEEE Trans. on Power Apparatus and Systems, 1983, 102(5):1218-1225.

Muckstadt, J.A., et al., "An Application of Lagrangian Relaxation to Scheduling in Power-Generation Systems", Operations Research, vol. 25, No. 3, 1977, pp. 387-403.

Ni, E., et al., "Scheduling Hydrothermal Power Systems with Cascaded and Head-dependent Reservoirs", IEEE Trans. on Power Systems, 1999, 14(3):1127-1132.

Ni, E., et al., "Minimizing Costs-at-MCPs in Unit Commitment for Pay-at-MCP Auctions under a Deregulated Market", Oct. 20, 2003.

Ni, E., et al., "Optimal Integrated Generation Bidding and Scheduling with Risk Management Under a Deregulated Power Market", IEEE Trans. on Power Systems, IEEE Trans. on Power Systems, Feb. 2004, 19(1):600-609.

Prasannan, B., et al., "Optimization-Based Sale Transactions and Hydrothermal Scheduling", IEEE Trans. Power Syst., May 1996, 11(2), at 654-659.

Shaw, J.J., "A Direct Method for Security-Constrained Unit Commitment", IEEE Trans. Power Systems, 10(3), Aug. 1995.

Sheffrin, A., "Empirical Evidence of Strategic Bidding in California ISO Real Time Market", Mar. 21, 2001, for CAISO, http://www/caiso.com.

Stern, G.A., "Market Power Mitigation Measures and Their Impacts on the California Electricity Market", Presented at 14th Annual Western Conference of Center for Research in Regulated Industries (http://crri.rutgers.edu) in San Diego, Jun. 2001.

Yan, H., et al., "Scheduling of Hydrothermal Power Systems Using the Augmented Lagrangian Decomposition and Coordination Technique", Proceedings of American Control Conference, pp. 1558-1562, 1994.

Yan, H., et al., "A Fuzzy Optimization-Based Method for Integrated Power System Scheduling and Inter-Utility Power Transaction with Uncertainties", IEEE Trans. Power Syst., May 1997, 12(2), at 756-763.

Zhai, Q., et al., "Unit Commitment with Identical Units: Successive Subproblem Solving Method Based on Lagrangian", IEEE Trans. on Power Systems, Nov. 2002.

Zhang, D., et al., "A Bundle Method for Hydrothermal Scheduling", IEEE Trans. on Power Systems, 1999,14(4):1355-1361.

Zhao, X., et al., "Surrogate Gradient Algorithm for Lagrangian Relaxation", Journal of Optimization Theory and Applications, vol. 100, No. 3, Mar. 1999, pp. 699-712.

Baldick, R. "The Generalized Unit Commitment Problem," *IEEE Transactions on Power Systems*, 10(1):465-475 (Feb. 1995).

Bertsekas, D.P., "Nonlinear Programming," Second Edition, Athena Scientific, 1999.

Carpentier, P. et al., "Stochastic Optimization of Unit Commitment: a New Decomposition Framework," *IEEE Transactions on Power Systems*, 11(2):1067-1073 (May 1996).

Cohen, A.I. et al., "Optimization-Based Methods for Operations Scheduling," *Proceedings of the IEEE*, 75(12):1574-1591 (Dec. 1987).

Guan, X. et al., "An Optimization-based method for unit commitment," *Int'l. J. Electric Power and Energy Systems*, 14(6):9-17 (Feb. 1992).

Guan, X. et al., "Nonlinear Approximation Method in Lagrangian Relaxation-Based Algorithms for Hydrothermal Scheduling," *IEEE Transactions on Power Systems*, 10(2):771-778 (May 1995).

Guan, X. et al., "Optimization-Based Scheduling of Hydrothermal Power Systems with Pumped-Storage Units" *IEEE Transactions on Power Systems*, 9(2):1023-1031 (May 1994).

Lauer, G.S. et al., "Solution of Large-Scale Optimal Unit Commitment Problems," *IEEE Transactions on Power Apparatus and Systems*, PAS-101(1):79-86 (Jan. 1982).

Yan, H. et al., "Scheduling of Hydrothermal Power Systems," *IEEE Transactions on Power Systems*, 8(3):1358-1365 (Aug. 1993).

Yan, J. et al., "Simultaneous Optimal Auction and Unit Commitment for Deregulated Electricity Markets," *The Electricity Journals*, 2-9 (Nov. 2002).

Zhang, L. et al., "Optimization-Based Inter-Utility Power Purchases," *IEEE Transactions on Power Systems*, 9(2):891-897 (May 1994).

Zhuang, F. et al., "Towards a More Rigorous and Practical Unit Commitment by Lagrangian Relaxation," *IEEE Transactions on Power Systems*, 3(2):763-773 (May 1988).

\* cited by examiner $$\min_{\{MCP^E, MCP^R, MCP^S, MCP^N, P^E, P^R, P^S, P^N, P^D\}} L_C, \text{ with}$$

$$L_c(\lambda^E, \lambda^R, \lambda^S, \lambda^N, \eta^E, \eta^R, \eta^S, \eta^N, \eta^D, MCP^E, MCP^R, MCP^S, MCP^N, P^E, P^R, P^S, P^N, P^D)$$

$$\equiv \sum_{i=1}^{I} \left( \sum_{t=1}^{T} \left( MCP^E(t) P_i^E(t) + MCP^R(t) P_i^R(t) + MCP^S(t) P_i^S(t) + MCP^N(t) P_i^N(t) \right) + \tilde{S}_i \right)$$

$$+ \sum_{t=1}^{T} \left\{ \lambda^E(t) \left[ \sum_{i=1}^{I} P_i^E(t) - \sum_{m=1}^{M} P_m^D(t) \right] + \frac{c}{2} \left( \sum_{i=1}^{I} P_i^E(t) - \sum_{m=1}^{M} P_m^D(t) \right)^2 \right\}$$

$$+ \sum_{t=1}^{T} \left\{ \lambda^R(t) \left[ P^R(t) - \sum_{i=1}^{I} P_i^R(t) \right] \right\} + \sum_{t=1}^{T} \left\{ \lambda^S(t) \left[ P^S(t) - \sum_{i=1}^{I} P_i^S(t) \right] \right\}$$

$$+ \sum_{t=1}^{T} \left\{ \lambda^N(t) \left[ P^N(t) - \sum_{i=1}^{I} P_i^N(t) \right] \right\}$$

$$+ \frac{1}{2c} \sum_{i=1}^{I} \sum_{t=1}^{T} \left\{ \left( \max \left\{ 0, \eta_i^E(t) + c \left[ O_i^E(P_i^E(t), t) - MCP^E(t) \right] \right\} \right)^2 - \eta_i^E(t)^2 \right\}$$

$$+ \frac{1}{2c} \sum_{i=1}^{I} \sum_{t=1}^{T} \left\{ \left( \max \left\{ 0, \eta_i^R(t) + c \left[ O_i^R(P_i^R(t), t) - MCP^R(t) \right] \right\} \right)^2 - \eta_i^R(t)^2 \right\}$$

$$+ \frac{1}{2c} \sum_{i=1}^{I} \sum_{t=1}^{T} \left\{ \left( \max \left\{ 0, \eta_i^S(t) + c \left[ O_i^S(P_i^S(t), t) - MCP^S(t) \right] \right\} \right)^2 - \eta_i^S(t)^2 \right\}$$

$$+ \frac{1}{2c} \sum_{i=1}^{I} \sum_{t=1}^{T} \left\{ \left( \max \left\{ 0, \eta_i^N(t) + c \left[ O_i^N(P_i^N(t), t) - MCP^N(t) \right] \right\} \right)^2 - \eta_i^N(t)^2 \right\}$$

$$+ \frac{1}{2c} \sum_{m=1}^{M} \sum_{t=1}^{T} \left\{ \left( \max \left\{ 0, \eta_m^D(t) + c \left[ MCP^E(t) - B_m(P_m^D(t), t) \right] \right\} \right)^2 - \eta_m^D(t)^2 \right\}$$

Fig. 6

SIMULTANEOUS OPTIMAL AUCTIONS USING AUGMENTED LAGRANGIAN AND SURROGATE OPTIMIZATION

CROSS REFERENCE TO RELATED APPLICATION

This application claims the benefit of U.S. Provisional Application Ser. No. 60/513,943, title "Simultaneous Optimal Auction For The ISO/RTO Electricity Markets Using Augmented Lagrangian And Surrogate Optimization" filed Oct. 24, 2003.

BACKGROUND

In April 1998, the electricity industry in California was deregulated, and the Independent System Operator (ISO) and Power Exchange (PX) were formed to operate the electricity grid and energy/capacity markets. Three sequential spot energy and capacity markets were formed as follows: the PX day-ahead market, the PX day-of market, and the ISO real-time market. In each of the markets, the participants would bid their energy, adjustments for relieving grid congestion, and five types of ancillary services separately, while the ISO and PX would auction these services in their markets correspondingly. This sequential and segregated nature significantly deteriorated the efficiency of the California electricity market, and resulted in a huge cost for California consumers during the 2000-01 energy crisis.

Other deregulated energy markets, such as the PJM ISO (serving Pennsylvania, New Jersey, and Maryland) and NY-ISO (New York ISO), are designed differently and a simultaneous optimal auction is used. In the simultaneous optimal auction, for example, the generators bid their generation into the day-ahead market in terms of energy price curves, start-up cost curves, minimum and maximum generation levels, and physical ramping rates. Hourly energy and ancillary services are procured and paid via the market clearing prices (MCP) for these services respectively, and the total procurement cost is minimized to meet the demand and reserve requirement. A day ahead generation and demand schedule is also produced to satisfy the grid network constraints and individual generation constraints.

Under this mechanism, it is crucial for the ISOs to minimize a proper objective function and to set the MCPs correctly, since market participants are charged or get paid based on the MCPs. The MCPs also have financial impacts on forward transactions outside the ISO markets.

What is lacking in the prior art, however, is a proper objective function to be minimized so that MCPs can be set correctly, and thereby minimize the total procurement cost for consumers. Preferably, the method to minimize this new objective function would use the well-developed formulation and solution methodology of the traditional unit commitment problem.

SUMMARY

The present invention meets this need by disclosing a new objective function that when minimized will set MCPs correctly. A method is disclosed for determining a market price, subject to a plurality of constraints and an actual purchase cost, comprising the steps of defining an objective function relating the market price and constraints in terms of a nonlinear programming expression, and minimizing the objective function consistent with the actual purchase cost. Preferably, the objective function comprises a sum over all market suppliers of the market price times the amount purchased plus the supplier's capacity related cost. The method can be extended to include transmission network constraints. In various embodiments the market price can be a market clearing price, a locational marginal price, or a treasury bill price.

Preferably, the step of minimizing the objective function comprises the steps of applying Lagrangian relaxation to the nonlinear programming expression to form a Lagrangian dual function; resolving the Lagrangian dual function using a surrogate optimization framework comprising repeating, until stopping criteria are satisfied, the steps of forming one or more supply sub-problems and a market price sub-problem; optimizing the market price sub-problem while keeping all other variables at their latest available values; optimizing at least one of the one or more supply sub-problems while keeping all other variables at their latest available values; and updating multipliers used to relax constraints; and determining the market price in accordance with the resolved Lagrangian dual function. Optionally, the method comprises the step of adding penalty terms to the Lagrangian dual function to form an augmented Lagrangian dual function. One or more sub-problems may be solved by using backward dynamic programming.

Optionally, the Lagrangian dual function may be resolved using a surrogate optimization framework comprising repeating, until stopping criteria are satisfied, the steps of forming one or more supply sub-problems; determining a maximum selected supply offer by optimizing at least one of the one or more supply sub-problems while keeping all other variables at their latest available values; setting the market price equal to the maximum selected supply offer while keeping all other variables at their latest available values; updating multipliers used to relax constraints; and determining the market price in accordance with the resolved Lagrangian dual function.

A method for determining a market clearing price (MCP) in an electricity market is described, subject to a plurality of constraints, comprising the steps of defining an objective function relating the MCP and constraints in terms of a nonlinear programming expression, applying Lagrangian relaxation to the nonlinear programming expression to form a Lagrangian dual function; adding penalty terms to the Lagrangian dual function to form an augmented Lagrangian dual function; resolving the augmented Lagrangian dual function using a surrogate optimization framework comprising repeating, until stopping criteria are satisfied, the steps of forming one or more supply sub-problems and an MCP sub-problem; optimizing the MCP sub-problem while keeping all other variables at their latest available values; optimizing at least one of the one or more supply sub-problems while keeping all other variables at their latest available values; and updating multipliers used to relax constraints; determining the MCP in accordance with the resolved augmented Lagrangian dual function; and paying for electricity at the MCP.

Optionally, the method of the invention can be applied to demand bids, capacity compensation, and ancillary services. The objective function then comprises a sum over all market suppliers of the market price for ancillary services times the amount purchased plus a capacity compensation for the supplier's capacity related cost. The ancillary services in various embodiments may comprise one or more of energy, regulation, spinning reserve, or non-spinning reserve. The step of minimizing the objective function may then comprise the steps of applying Lagrangian relaxation to the nonlinear programming expression to form a Lagrangian dual function; resolving the Lagrangian dual function using a surrogate optimization framework comprising repeating, until stopping criteria are satisfied, the steps of forming one or more demand sub-problems and a market price sub-problem; optimizing the market price sub-problem while keeping all other variables at their latest available values; optimizing at least one of the one or more demand sub-problems while keeping all other variables at their latest available values; and updating multipliers used to relax constraints; and determining the market price in accordance with the resolved Lagrangian dual function.

A system is also described for determining a market price, subject to a plurality of constraints and an actual purchase cost, comprising a data processing system in communication with a mass storage device; a computer readable mass storage medium useable in the mass storage device, containing program instructions: encoding an objective function relating the market price and constraints in terms of a nonlinear programming expression, and sufficient to cause the data processing system to perform the step of minimizing the objective function consistent with the actual purchase cost.

A system for determining a market clearing price (MCP) in an electricity market is disclosed, subject to a plurality of constraints, comprising a data processing system in communication with a mass storage device; a computer readable mass storage medium useable in the mass storage device, containing program instructions: encoding an objective function relating the MCP and constraints in terms of a nonlinear programming expression, and sufficient to cause the data processing system to perform the steps of resolving the nonlinear programming expression using a surrogate optimization framework; and determining the MCP in accordance with the resolved nonlinear programming expression.

A computer readable mass storage medium useable in a mass storage device to determine a market price is described, subject to a plurality of constraints and an actual purchase cost, containing program instructions encoding an objective function relating the market price and constraints in terms of a nonlinear programming expression, and sufficient to cause a data processing system to perform the step of minimizing the objective function consistent with the actual purchase cost.

BRIEF DESCRIPTION OF DRAWINGS

These and other features, aspects and advantages of the present invention will become better understood with reference to the following description, appended claims, and accompanying drawings where:

FIG. 6 is Equation A.12.

DETAILED DESCRIPTION

Figure 1:
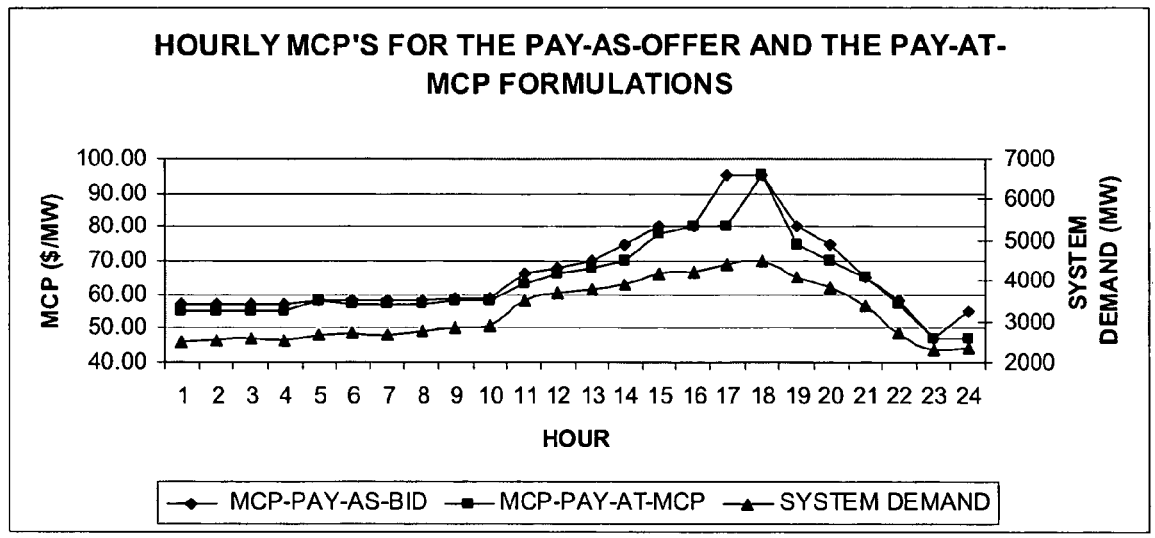
FIG. 1 is a graph of hourly MCPs for the Pay-as-Offer and the Pay-at-MCP formulations for Example 3.

Currently most ISOs run a simultaneous auction on a daily basis to procure energy and ancillary services, and determine market clearing prices (MCPs) for each product with a minimization of the total bid cost. This optimization has been treated similarly to the traditional unit commitment problem by incorporating generation offer costs into the objective function instead of generation fuel costs. The problem is then solved by the Lagrangian relaxation technique, and the system marginal costs derived from the approach have been used to establish the MCPs for settlements.

The Traditional Unit Commitment Problem and Solution Methodology

The formulation of a unit commitment is first presented in order to compare it to the formulation of a simultaneous optimal auction. A traditional unit commitment of a power system with thermal, hydro, and pumped storage generation units, and bilateral contracts is used to determine when to start up and/or shut down generation units, or take contracted energy, and how to dispatch the committed units and contracts to meet system demand and reserve requirements over a particular time period. Each unit or contract may have limited energy, minimum up/down times, and/or other constraints. The objective is to minimize the total generation cost. The traditional unit commitment itself is an NP hard problem, i.e., the computational requirements of obtaining an optimal solution grow exponentially with the size of the problem (e.g., the number of generators involved).

This class of mixed integer programming problems has been an active research subject for several decades because of potential savings for operating costs and labor. In previous work, a unit commitment for a power system with thermal, hydro, and pumped storage generation units, and purchased and sold contracts, was formed as a mixed integer programming problem, and the Lagrangian relaxation approach was used to obtain a near optimal solution. The basic idea is to relax system demand and reserve requirements by using Lagrange multipliers. The relaxed problem can be decomposed into individual unit commitment sub-problems, which are much easier to solve. The problem is then solved in a two level iterative process. At the low level the individual sub-problems are solved, while at the high level the Lagrange multipliers are optimized by using continuous variable optimization techniques. Note that the separable structure of the problem is a key factor for Lagrangian relaxation to be effective. (A problem is separable and can be decomposed into multiple sub-problems if both the objective function and the constraints that couple sub-problems are additive in terms of sub-problem decision variables.) The disadvantage of this method is that the dual solution is generally infeasible, i.e., the once relaxed system constraints are not satisfied. Heuristics are needed to modify subproblem solutions to obtain a good feasible schedule. Nevertheless, since the value of the dual function is a lower bound on the optimal cost, the quality of the feasible solution can be quantitatively evaluated. The limitations of the transmission network can also be defined as system constraints and incorporated into the Lagrangian relaxation framework.

The Lagrangian relaxation technique has been well developed and applied to the unit commitment problem with a complex set of system constraints and individual generation/transaction constraints. The method has been shown to work, for example, in cases based on expected operational data for an ISO in the northeast United States. Many commercial software programs are available to solve variations of this problem.

The Pay-As-Offer Problem Formulation

In this section, the Pay-as-offer formulation currently used to obtain MCPs is described. For simplicity of presentation, only system demand and maximum/minimum power limits are considered. Other constraints such as minimum up/down time and system reserve requirements can be formulated as is known in the art with reference to this disclosure.

Consider an energy market with I supply offers, i=1, 2, ..., I. For supply offer i, the offer curve or offer price for supplying power $p_i(t)$ at time t ($1 \leq t \leq T$) is denoted by $O_i(p_i(t),t)$, the cost curve is denoted by $C_i(p_i(t),t)$, and the startup or capacity related cost is denoted by $S_i(t)$. The startup cost is incurred if and only if a participant supplies power from an "off" state in the previous hour. Assume that the system demand over the planning horizon $\{P_d(t)\}$ are given. The objective of the ISO is to select supply offers and their associated power levels over the specified time period T so that the system demand and the minimum/maximum power level constraints are satisfied at the minimum cost. The market clearing price (MCP) for a particular time is then obtained as the maximum offer price of all selected participants. Currently most ISOs determine the MCPs by minimizing the Pay-as-Offer costs using the following objective function:

$$\min_{\{p_i(t)\}} J, \text{ with } J \equiv \sum_{t=1}^{T} \sum_{i=1}^{I} \{C_i(p_i(t), t) + S_i(t)\}. \tag{1}$$

The fuel cost of a thermal unit is usually modeled as a quadratic function or a piecewise linear function of the generation level, and the start-up cost as an exponential or linear function of time since last shut down. Without loss of generality, the fuel cost or transaction cost $C_i(p_i(t))$ and start-up cost or capacity-related cost $S_i(t)$ are assumed in this disclosure to be piecewise linear and linear functions, respectively.

System demand constraints require that the total power from all selected offers should equal the system demand $P_d(t)$ at each time, i.e., $$h(t) = P_d(t) - \sum_{i=1}^{I} p_i(t) = 0, t = 1, 2, \ldots, T. \tag{2}$$

These constraints couple individual offers. Similar to the unit commitment problem where a unit can be on or off, a binary variable $u_i(t)$ is defined to represent the status of a supply offer. The offer is considered "on" (1) if it is selected and "off" (0) if it is not selected. Minimum/maximum power level limits can be represented as:

$$p_i(t)=0, \text{ if } u_i(t)=0, \tag{3}$$

$$p_{imin}(t) \leq p_i(t) \leq p_{imax}(t), \text{ if } u_i(t)=1, t=1, 2, \ldots, T, \tag{4}$$

where $p_{imin}(t)$ and $p_{imax}(t)$ are, respectively, the minimum and maximum power levels for supply offer i at hour t.

This Pay-as-offer formulation is separable since both the objective function and the coupling system demand constraints are additive. By using Lagrange multipliers to relax the system demand constraints of Eq. (2), the problem can be converted to a two-level optimization problem. At the low level individual offer sub-problems are minimized based on a given set of Lagrange multipliers, while at the high level the multipliers are updated. This iterative process continues until the system demand constraints are satisfied or some stopping criteria are met.

Simultaneous Optimal Auction and New Pay-At-MCP Formulation

Generally speaking, there are two pricing mechanisms typically used in deregulated electricity markets: pay-as-bid and market clearing price. Market participants submit their energy bid pairs (price and MWs) to the market, and the market clears at the intersection of the supply and demand curves. Supply participants will be paid at their bid price in the pay-as-bid mechanism while they will be paid at the market-clearing price, which is the highest price to clear the market, in the market-clearing price mechanism. Both of the mechanisms were implemented in the California electricity market in the past. For example, the ISO real-time energy market uses the market-clearing price mechanism, but the PX Block Forward Market, now defunct, was a pay-as-bid market. Each mechanism has its advantages and disadvantages, and impacts on participants' bidding behaviors and market outcome of efficiency.

Electricity is frequently described as different from other commodities. Electricity markets are not only used to sell or buy energy (electrons) but also ancillary services necessary to maintain system reliability (e.g., regulation up, regulation down, spinning reserve, non-spinning reserve, and replacement reserve, in California). Basically, energy usage is competing against ancillary services for the same generation capacity, while the provision of committed energy and ancillary services must simultaneously be feasible and satisfy all of the transmission network constraints. Originally, the California market was designed to auction energy and deal with transmission line congestion using a set of adjustment bids different from the energy bids, and subsequently auction each of ancillary services separately in day-ahead and hour ahead markets, based on a market-clearing price mechanism. This sequential and segregated nature significantly deteriorated the efficiency of the California electricity market, and contributed to huge costs for California consumers during the 2000-01 energy crisis.

The other deregulated energy markets such as the PJM ISO and NY-ISO, have been designed differently using a simultaneous, market-clearing optimal auction. In the simultaneous optimal auction, for example, generators bid their generation into the day-ahead market in terms of energy price curves, startup cost curves, minimum and maximum generation levels, and ramping rates. Hourly energy and ancillary services are procured and paid at market-clearing prices for these services to meet the demand and reserve requirement while satisfying transmission constraints.

The Pay-as-offer objective function of Eq. (1) intrinsically implies that ISOs will pay selected participants their offer prices (the Pay-as-offer mechanism). However, most ISOs settle their markets using the Pay-at-MCP mechanism, where the MCPs are used to pay all participants who provide the energy. The MCP for time t is defined as the maximum offer price of all selected supply offers, i.e., $$MCP(t)=\max\{O_i(p_i(t),t)), \forall i \text{ such that } p_i(t)>0\}. \tag{5}$$

In this case, the purchase cost could be significantly higher than the cost obtained from the minimization in Eq. (1), since participants with supply offers lower than the MCP are paid at the MCP.

In view of the above, the objective function of Eq. (1) used in the current scheme is inappropriate since the minimized cost is not consistent with the actual purchase cost incurred. The appropriate formulation is to directly minimize the purchase cost, i.e., $$\min_{\{MCP(t)\},\{p_i(t)\}} J, \text{ with } J \equiv \sum_{t=1}^{T} \sum_{i=1}^{I} \{MCP(t)p_i(t) + S_i(t)\}. \quad (6)$$

For notational convenience, a function f(t) can be defined as:

$$f(t) \equiv \sum_{i=1}^{I} \{MCP(t)p_i(t) + S_i(t)\}, \quad (6a)$$

then the new "Pay-at-MCP" objective function may be written as:

$$J \equiv \sum_{t=1}^{T} f(t). \quad (7)$$

Mathematically, this is a simultaneous optimal auction based on a market clearing price mechanism formulated so as to minimize the total procurement cost for energy and ancillary services. This optimization is subject to the constraints shown in Eq. (2), Eq. (3) and Eq. (4), where the MCP is defined as in Eq. (5).

Compared to the Pay-as-offer objective function of Eq. (1), the Pay-at-MCP objective function is complicated because it is a function of both the MCPs and power levels of selected supply offers, while MCPs themselves are yet to be determined (endogenous) based on selected offer curves per Eq. (5). Furthermore, the existence of cross product terms of MCPs and selected power levels in Eq. (6) makes the problem inseparable. (Here, $\{p_i\}$ and $\{MCP(t)\}$ are treated as decision variables. There are other ways to look at the problem by exploiting special features of the formulation. However, the method presented here is generic and robust.) Consequently, direct application of Lagrangian relaxation may not be effective.

MCP-Offer Inequality Constraints

Note that MCP(t) is defined as the maximum offer price of all the selected offers at time t. From Eq. (5), it is clear that if participant i is awarded power level $p_i(t)$, then MCP(t) should be greater than or equal to the offer price $O_i(p_i(t),t)$ evaluated at $p_i(t)$. If no power is awarded, i.e., $p_i(t)=0$, then $O_i(p_i(t),t)$ has no role in determining MCP(t). MCP(t) as defined in Eq. (5) is thus related to selected offers only. For mathematical convenience the offer price or offer curve may be redefined to be zero if no power is awarded, i.e., $$O_i^r(p_i(t), t) \equiv \begin{cases} O_i(p_i(t), t), & p_i(t) > 0, \\ 0, & p_i(t) = 0. \end{cases} \quad (8)$$

In this way, MCP becomes dependent on all the offers as opposed to being dependent on only selected offers, and Eq. (5) can be equivalently written as the following "MCP—Offer constraints" (MCP "minus" Offer) in linear inequality form:

$$MCP(t) \geq O_i^r(p_i(t),t), \forall i \text{ and } t, \quad (9a)$$

or equivalently, $$g_i(t) \equiv O_i^r(p_i(t),t) - MCP(t) \leq 0, \forall i \text{ and } t. \quad (9)$$

The above inequality constraints now couple MCPs with all offers, and may be relaxed by Lagrange multipliers.

Solution of Pay-At-MCP Objective Function

The problem formulation of a simultaneous optimal auction with a market clearing price mechanism (the "Pay-at-MCP problem") is different from the unit commitment problem, and difficult to solve. In this section, an augmented Lagrangian relaxation method is developed to solve the Pay-at-MCP problem within a surrogate optimization framework.

Augmented Lagrangian Relaxation and Surrogate Optimization Framework (ALSO)

To solve Eq. (6), preferably, but optionally, the augmented Lagrangian as opposed to the standard Lagrangian can be used in view that linear sub-problem objective functions will cause solution oscillations when the standard Lagrangian is used. While it is possible to proceed with the standard Lagrangian, these difficulties are overcome by using the augmented Lagrangian, which is formed by adding penalty terms associated with equality and inequality constraints to the Lagrangian. Preferably these penalty terms are quadratic, but other penalty terms, including exponential, are known in the art with reference to this disclosure, and could be useable in the present invention.

An added benefit of the augmented Lagrangian is that the relaxed problem is more convex than the standard Lagrangian, and this should improve overall convergence. The main difficulty of the augmented Lagrangian method is that of inseparability. However, this is not a major issue for the surrogate optimization framework developed here.

A surrogate optimization framework (SOF) may be used to overcome the difficulty of inseparability. The key idea is to pull out all the terms associated with a supply offer from the augmented Lagrangian to form a supply sub-problem, and decision variables for this offer are optimized while keeping all other variables such as MCPs at their latest available values. The MCP sub-problem for time t is similarly formed by pulling out all the terms containing MCP(t). It is then solved by optimizing MCP(t) while keeping all other variables such as power levels $\{p_i(t)\}$ at their latest available values. The multipliers used to relax constraints are updated after solving just one or a few sub-problems under this surrogate framework.

Detail of Augmented Lagrangian Relaxation

When the augmented Lagrangian relaxation method is applied to Eq. (7), subject to system demand equality constraints of Eq. (2), and the MCP—Offer inequality constraints of Eq. (9), the augmented Lagrangian is obtained as:

$$L_c(\lambda, \eta_i, p_i, MCP) \equiv \sum_{t=1}^{T} \{f(t) + \lambda(t)h(t) + 0.5c\|h(t)\|^2\} + \sum_{i=1}^{I} (\eta_i(t)(g_i(t) + z_i^2(t)) + 0.5c\|g_i(t) + z_i^2(t)\|^2) \quad (D.1)$$

where $z_i^2(t)$ is a non-negative slack variable used to convert Eq. (9) into an equality constraint. The above augmented Lagrangian is to be minimized by selecting appropriate $\{MCP(t)\}$, $\{p_i(t)\}$, and $\{z_i^2(t)\}$. The process is to first select $z_i^2(t)$ subject to $z_i^2(t) \geq 0$, and the resulting augmented Lagrangian can be simplified to:

$$L_c(\lambda, \eta_i, p_i, MCP) = \sum_{t=1}^{T} \{f(t) + \lambda(t)h(t) + 0.5c\|h(t)\|^2\} + \quad \text{(D.2)}$$
$$\sum_{t=1}^{T}\sum_{i=1}^{I} ([\max\{0, \eta_i(t) + cg(t)\}]^2 - \eta_i(t)^2)/2c$$

Offer Sub-Problems

The sub-problem for supply offer i is formed from Eq. (D.2) by pulling out all the terms related to offer i, i.e., $\{p_i(t)\}$ and $\{S_i(t)\}$. By expanding the terms in Eq. (D.2), the offer i sub-problem is obtained as:

$$\min_{\{p_i(t)\}} L_i, \text{ with } L_i \equiv \sum_{t=1}^{T} \Bigg\{ (MCP(t) - \lambda(t))p_i(t) + \quad \text{(D.3)}$$
$$S_i(t) + 0.5c\Bigg(p_i(t)^2 - 2p_i(t)\Bigg(P_d(t) - \sum_{j=1, j\neq i}^{I} p_j(t)\Bigg)\Bigg) +$$
$$\frac{[\max\{0, \eta_i(t) + c(O_i^r(p_i(t), t) - MCP(t))\}]^2 - \eta_i(t)^2}{2c} \Bigg\}$$

where $\{p_i(t)\}$ are the decision variables and all other decision variables are taken at their latest available values. This optimization is solved by using backward dynamic programming (BDP), where times (hours) are stages, and the select status (selected or not selected) are states. The startup cost $S_i(t)$ is a transition cost which is incurred only when offer i goes from an off state to an on state. All the other costs in Eq. (D.3) are stage-wise costs.

MCP Sub-Problems

In view that there is no cross product terms for MCPs of different times, T MCP sub-problems are formed, one for each t, by expanding Eq. (D.2) and collecting all the terms involving MCP(t), i.e., $$\min_{MCP(t)} L_{MCP(t)}, \text{ with } L_{MCP(t)} \equiv \quad \text{(D.4)}$$
$$\Bigg(\sum_{i=1}^{I} p_i(t)\Bigg) MCP(t) + \frac{\sum_{i=1}^{I} [\max\{0, \eta_i(t) + c(O_i^r(p_i(t), t) - MCP(t))\}]^2}{2c}$$

where decision variables other than MCP(t) are taken at their latest available values. We can define:

$$a_i(t) \equiv \eta_i(t) + c(O_i^r(p_i(t),t) - MCP(t)). \quad \text{(D.5)}$$

Figure 2:
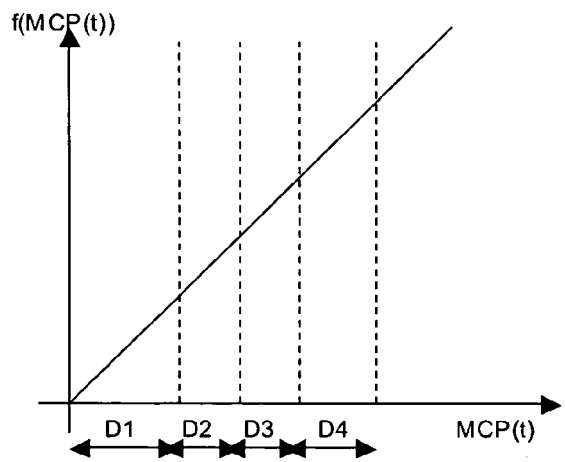
FIG. 2 is a graph of decision regions used in solving MCP sub-problems.

Note that $L_{MCP(t)}$ in Eq. (D.4) is the sum of a linear term $(\Sigma p_i(t)) \cdot MCP(t)$ and quadratic terms which depend on the magnitudes of $\{a_i(t)\}$ for individual offers. For offer i, if $a_i(t)$ is positive then Eq. (D.4) includes a quadratic term of MCP(t) in the form of $a_i(t)^2/2c$. However, for MCP(t) larger than $k_i(t)$ defined as $$k_i(t) \equiv [\eta_i(t)/c + O_i^r(p_i(t),t)], \quad \text{(D.6)}$$

the quadratic term in Eq. (D.4) takes zero value. Thus the second term on the right-hand-side of Eq. (D.4) represents many "half quadratics" delineated by $\{k_i(t)\}$ as shown in FIG. 2, and the MCP(t) axis is divided into multiple decision regions, each with a quadratic $L_{MCP(t)}$. The sub-problem for MCP(t) is first solved for each region by minimizing the corresponding quadratic function, and the costs of individual regions are then compared to obtain the optimal MCP(t).

Update of Multipliers

The surrogate subgradient component for time t with respect to the system demand multiplier $\lambda(t)$ is obtained from Eq. (D.2) as:

$$S_\lambda(t) = P_d(t) - \sum_{i=1}^{I} p_i(t). \quad \text{(D.7)}$$

Similarly, the surrogate subgradient component for offer i at time t with respect to the MCP-offer multiplier is also obtained from Eq. (D.2) as:

$$S_{\eta_i}(t) = O_i^r(p_i(t),t) - MCP(t). \quad \text{(D.8)}$$

Let $S_\lambda$ and $S_{\eta_i}$ denote, respectively, the column vectors of the surrogate subgradient with respect to $\lambda$ and $\eta_i$. Then the multipliers are updated at the high level after one or multiple sub-problems are solved based on the following update formulas either from the Multiplier Method with subgradients in the formula replaced by surrogate subgradients:

$$\lambda^{k+1}(t) = \lambda^k(t) + c^k S_\lambda(t), \quad \text{(D.9)}$$
$$\eta_i^{k+1}(t) = \max(0, \eta_i^k(t) + c^k S_{\eta_i}(t)); \quad \text{(D.10)}$$

or from the Surrogate Subgradient Method:

$$\lambda^{k+1}(t) = \lambda^k(t) + \alpha^k S_\lambda(t), \quad \text{(D.9a)}$$
$$\eta_i^{k+1}(t) = \max(0, \eta_i^k(t) + \alpha^k S_{\eta_i}(t)); \quad \text{(D.10a)}$$

where $\alpha^k$ is an appropriate step size at iteration k.

Constraint Violation

The level of constraint violation for hour t with respect to the system demand equality constraint is given by the absolute value of $S_\lambda(t)$, i.e., $|S_\lambda(t)|$. For MCP-offer equality constraints, if $S_{\eta_i}(t)$ is negative, the inequality constraint is satisfied and there is no constraint violation. If $S_{\eta_i}(t)$ is positive then the inequality constraint is violated. Consequently, the level of constraint violation is given by $\max(0, S_{\eta_i}(t))$. The level of constraint violation for the entire problem can thus be measured by the L-2 norm of the following constraint violation vector:

$$S_{cv} = \begin{pmatrix} |S_\lambda| \\ \max(0, S_{\eta_i}) \end{pmatrix}. \quad \text{(D.11)}$$

Summary of the ALSO Algorithm

Figure 3:
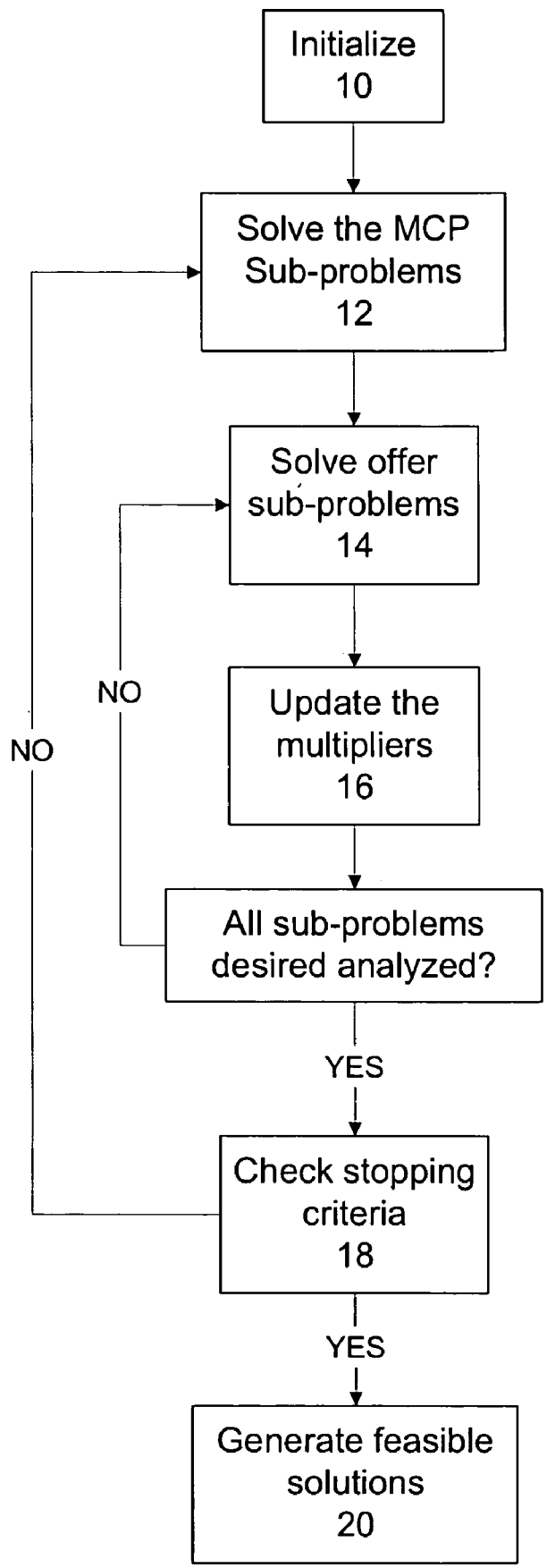
FIG. 3 is a flow chart of one embodiment of the method of the present invention.

With reference to FIG. 3, the summary of the ALSO algorithm is as follows:

Step 10. [Initialize.] Initialize $p_i(t)$, MCP(t), and $\lambda(t)$ by using a priority order loading heuristic. Initialize all other multipliers to zero, and set the penalty parameter $c^k$ to an appropriate positive value.

Step 12. [Solve the MCP sub-problems.] Solve the MCP sub-problems and update the multipliers.

Step 14. [Solve offer sub-problems.] Solve one or multiple offer sub-problems.

Step 16. [Update the multipliers.] Update the multipliers and go back to Step 14. After all the offer sub-problems are solved, go to Step 18.

Step 18. [Check Stopping Criteria.] If stopping criteria have not been satisfied, go to Step 12. Otherwise, go to Step 20.

Step 20. [Generate feasible solutions.] Use simple heuristics to obtain a feasible solution if the sub-problem solutions obtained are infeasible.

Optionally, the Lagrangian dual function may be resolved using a surrogate optimization framework comprising repeating, until stopping criteria are satisfied, the steps of forming one or more supply sub-problems; determining a maximum selected supply offer by optimizing at least one of the one or more supply sub-problems while keeping all other variables at their latest available values; setting the market price equal to the maximum selected supply offer while keeping all other variables at their latest available values; updating multipliers used to relax constraints; and determining the market price in accordance with the resolved Lagrangian dual function.

EXAMPLE 1

Assume that an ISO seeks to satisfy a system demand of 80 MW based on two single block supply offers received that have the parameters given in Table 1. For simplicity of presentation, the planning horizon is one hour, startup costs are assumed to be zero, and Table 1 was designed so that both offers would be selected since no single offer can completely satisfy the system demand.

TABLE 1

Characteristics of Supply Offers for Example 1

Hour 1, System Demand = 80 MW

|  | Min MW | Max MW | $/MW | Start Up Cost |
|---|---|---|---|---|
| Offer 1 | 5 | 50 | 10 | 0 |
| Offer 2 | 5 | 50 | 20 | 0 |

Let $p_1$ and $p_2$ be the awarded power levels for offers 1 and 2, respectively. Under the Pay-at-MCP formulation of the present invention the objective function for this problem is given by:

$$\min J, \text{ with } J \equiv (MCP \cdot p_1 + MCP \cdot p_2). \quad (10)$$

The total power supplied by the two offers should satisfy the system demand constraint, i.e., $$80 = p_1 + p_2. \quad (11)$$

For this example, both offers will be selected since no single offer can satisfy the system demand. The MCP-Offer constraints for this example are:

$$MCP \geq 10; \quad (12)$$

$$MCP \geq 20. \quad (13)$$

Augmented Lagrangian Relaxation. An augmented Lagrangian is now formed by adding penalty terms (in this example quadratic) of system demand equality constraints Eq. (11) and MCP-Offer inequality constraints Eq. (12) and Eq. (13) to the Lagrangian. The minimization of the augmented Lagrangian is then obtained as:

$$\min L_c, \text{ with } L_c(p_1, p_2, MCP) \equiv \quad (14)$$
$$MCP \cdot p_1 + MCP \cdot p_2 + \lambda(80 - p_1 - p_2) + \eta_1(10 - MCP + z_1^2) +$$
$$\eta_2(20 - MCP + z_2^2) + 0.5c(80 - p_1 - p_2)^2 +$$
$$0.5c(10 - MCP + z_1^2)^2 + 0.5c(20 - MCP + z_2^2)^2$$

where c is a positive penalty coefficient and $z_1^2$ and $z_2^2$ are positive slack variables used to convert the inequality constraints of Eq. (12) and Eq. (13), respectively, into equality constraints.

With the addition of the penalty terms, no additional cost is added to the objective function if the constraints are satisfied. On the other hand, a significant cost is imposed by the penalty terms if the constraints are violated. This encourages feasible solutions to be selected at the expense of infeasible solutions. By minimizing and simplifying Eq. (14) above the augmented Lagrangian is obtained as:

$$L_c(p_1, p_2, MCP) \equiv MCP \cdot p_1 + MCP \cdot p_2 + \lambda(80 - p_1 - p_2) + \quad (15)$$
$$0.5c(80 - p_1 - p_2)^2 + 0.5[\max(0, \eta_1 + c(10 - MCP))^2 - \eta_1^2]/c +$$
$$0.5[\max(0, \eta_2 + c(20 - MCP))^2 - \eta_2^2]/c.$$

Offer Sub-Problems

As mentioned earlier, the sub-problem for a supply offer is formed from the augmented Lagrangian by pulling out all the terms related to that offer, i.e., $\{p_i(t)\}$ and $\{S_i(t)\}$. The decision variables are $\{p_i(t)\}$ and decision variables for other sub-problems are taken at their latest available values. The offer sub-problem is solved by using backward dynamic programming (BDP), where times (hours) are stages, and the select status (selected or not selected) are states. The startup cost $S_i(t)$ is a transition cost which is incurred only when offer i goes from an off state to an on state. All the other costs are stage-wise costs.

For this example, all the terms related to an offer are pulled from Eq. (15) to form the following offer sub-problems:

$$\min L_1, \text{ with } L_1 \equiv (MCP - \lambda)p_1 + 0.5c[p_1^2 - 2p_1(80 - p_2)], \quad (16)$$

$$\min L_2, \text{ with } L_2 \equiv (MCP - \lambda)p_2 + 0.5c[p_2^2 - 2p_2(80 - p_1)], \quad (17)$$

In solving Eq. (16), $p_1$ is optimized while MCP and $p_2$ are taken at their latest available values. Similarly Eq. (17) is solved by optimizing $p_2$ while MCP and $p_1$ are taken at their latest available values. Note that without the augmented Lagrangian, c is zero in Eq. (16) and Eq. (17), and the offer sub-problem objective functions are linear. Now with the augmented Lagrangian, c is a positive number, and the objective functions are quadratic which eliminates the solution oscillation difficulties associated with linear objective functions.

MCP Sub-Problems

In light of the fact that there are no cross product terms for MCPs for different times, T MCP sub-problems are formed for the different hours by collecting all the terms involving MCP(t). In solving an MCP sub-problem, MCP(t) is optimized while all other decision variables are taken at their latest available values. Since MCPs appear in all the offer sub-problems, it is recommended that the MCP sub-problems be solved before solving individual offer sub-problems.

For this example, the MCP sub-problem is formed from Eq. (15) by collecting all the terms containing MCP, i.e., $$\min L_{MCP}, \text{ with } L_{MCP} \equiv \quad (18)$$
$$(p_1 + p_2)MCP + 0.5[\max(0, \eta_1 + c(10 - MCP))^2 - \eta_1^2]/c +$$
$$0.5[\max(0, \eta_2 + c(20 - MCP))^2 - \eta_2^2]/c.$$

The MCP sub-problem is solved by optimizing MCP in Eq. (18) while $p_1$ and $p_2$ are considered as given.

Update of Multipliers

Noting that only the decision variables associated with a particular sub-problem are minimized while all other variables are kept at their latest values when solving the sub-problem, the optimization is not exact but approximate. Consequently, the subgradients obtained are approximate and are referred to as "surrogate subgradients." The multipliers are updated at the high level after one or multiple sub-problems are solved based on the update formula from either the Multiplier Method or the Subgradient Method, with subgradients in the formula replaced by surrogate subgradients.

For Example 1, the surrogate subgradient with respect to the system demand multiplier $\lambda$ is obtained from Eq. (15) as:

$$S_\lambda = 80 - p_1 - p_2. \tag{19}$$

The surrogate subgradients with respect to the MCP-Offer multipliers $\eta_1$ and $\eta_2$ are respectively obtained from Eq. (15) as:

$$S_{\eta 1} = 10 - MCP, \tag{20}$$

$$S_{\eta 2} = 20 - MCP, \tag{21}$$

The multipliers are updated at the high level after one or multiple sub-problems are solved based on the following update formulas:

$$\lambda^{k+1} = \lambda^k + c^k S_\lambda. \tag{22}$$

$$\eta_1^{k+1} = \max(0, \eta_1^k + c^k S_{\eta 1}) \tag{23}$$

$$\eta_2^{k+1} = \max(0, \eta_2^k + c^k S_{\eta 2}) \tag{24}$$

Stopping Criteria

The iterative process is terminated if the number of iterations is greater than a preset value or if the level of constraint violation is less than a specified small positive number.

Heuristics

Similar to all Lagrangian relaxation-based approaches, simple heuristics are used to obtain feasible solutions if the subproblem solutions obtained are infeasible. The detailed mathematical derivation of the solution methodology is provided in the appendix.

Numerical Testing Results

The Pay-at-MCP/ALSO and the Pay-as-offer algorithms were implemented in C++ on a Pentium-III 500 MHz personal computer with supply offers having single constant segments. For consistency of comparison, an augmented Lagrangian relaxation method was used for the Pay-as-offer algorithm. The Numerical results obtained when the Pay-at-MCP/ALSO method was applied to Example 1 are provided in Table 2.

TABLE 2

Results for Example 1 using the Pay-at-MCP method

Hour 1, MCP = $20/MW

|  | MW | $/MW | Start Up Cost |
|---|---|---|---|
| Offer 1 | 50 | 10 | 0 |
| Offer 2 | 30 | 20 | 0 |

Total Cost = $1600

Numerical results obtained when the two algorithms were applied to two examples are presented next.

Example 2 is used to illustrate the subtle differences between the Pay-as-offer and the Pay-at-MCP formulations as well as to provide insights on the convergence and other characteristics of the ALSO algorithm. Example 3 demonstrates that the ALSO algorithm is applicable to a medium sized auction problem and significant savings can be achieved over the Pay-as-offer method.

EXAMPLE 2

In this example, ALSO and the Pay-as-offer algorithms are applied to a four participant, two hour problem for which the optimal solution under either the pay-as-offer or the pay-at-MCP formulation can be verified by enumeration. The system demands for the two hours are respectively 100 MW and 150 MW. The supply offer parameters are shown in Table 2. Assume that at time zero all offers are in an off state. Using the Pay-as-offer formulation, the results in Table 4 were obtained. In Table 4, "Pay-As-Offer Costs" represents the costs to be incurred if participants were paid at their individual offer prices. The "Actual Costs" in the table denote the actual costs incurred by ISOs who pay selected participants using a common MCP. It is important to note that these actual costs are also those that would be incurred by the consumers in this system.

TABLE 3

Supply Offer Parameters for Example 2

|  | Hour 1, System Demand = 100 MW | | | | Hour 2, System Demand = 150 MW | | | |
|---|---|---|---|---|---|---|---|---|
|  | Min MW | Max MW | $/MW | Start Up Cost | Min MW | Max MW | $/MW | Start Up Cost |
| Offer 1 | 5 | 50 | 10 | 0 | 5 | 60 | 15 | 0 |
| Offer 2 | 5 | 40 | 20 | 0 | 5 | 60 | 20 | 0 |
| Offer 3 | 0 | 10 | 65 | 50 | 0 | 30 | 65 | 50 |
| Offer 4 | 5 | 60 | 30 | 1800 | 5 | 100 | 30 | 1800 |

TABLE 4

Results Using the Pay-As-Offer Method

| | HOUR 1, MCP = 65$/MW | | | | HOUR 2, MCP = 65$/MW | | | |
|---|---|---|---|---|---|---|---|---|
|  | MW | $/MW | Pay-As-Offer Costs | Actual Costs Using MCP | MW | $/MW | Pay-As-Offer Costs | Actual Costs Using MCP |
| Offer 1 | 50 | 10 | 500 | 3250 | 60 | 15 | 900 | 3900 |
| Offer 2 | 40 | 20 | 800 | 2600 | 60 | 20 | 1200 | 3900 |

TABLE 4-continued

Results Using the Pay-As-Offer Method

| | HOUR 1, MCP = 65$/MW | | | | HOUR 2, MCP = 65$/MW | | | |
|---|---|---|---|---|---|---|---|---|
| | MW | $/MW | Pay-As-Offer Costs | Actual Costs Using MCP | MW | $/MW | Pay-As-Offer Costs | Actual Costs Using MCP |
| Offer 3 | 10 | 65 | 700 | 700 | 30 | 65 | 1950 | 1950 |
| Offer 4 | 0 | 30 | 0 | 0 | 0 | 30 | 0 | 0 |
| | Cost | | $2,000 | $6,550 | Cost | | $4,050 | $9,750 |

Total Pay-As-Offer Costs = $6,050
Actual Purchase Costs Using MCPs = $16,300

When ALSO was applied to Example 2, the results obtained are as shown in Table 5. In Table 4 the "Pay-at-MCP Costs" are the same as the actual purchase costs.

TABLE 5

Results Using the Pay-at-MCP Method

| | HOUR 1, MCP = 30 $/MW | | | HOUR 2, MCP = 30 $/MW | | |
|---|---|---|---|---|---|---|
| | MW | $/MW | Pay-At-MCP Costs | MW | $/MW | Pay-At-MCP Costs |
| Offer 1 | 50 | 10 | 1500 | 60 | 15 | 1800 |
| Offer 2 | 40 | 20 | 1200 | 60 | 20 | 1800 |
| Offer 3 | 0 | 65 | 0 | 0 | 65 | 0 |
| Offer 4 | 10 | 30 | 2100 | 30 | 30 | 900 |
| | Cost | | $4,800 | Cost | | $4,500 |

Total Pay-At-MCP Costs = Actual Purchase Costs = $9,300

The least cost for supplying the system demand over the two hours, $6,050, would be obtained if a Pay-as-offer formulation were used and selected participants were paid at their offer prices via a Pay-as-offer mechanism (assuming of course, that their behavior would not change under a Pay-as-offer system, an assumption which may not be realistic). However, paying selected participants using MCPs results in an actual total cost of $16,300, which is significantly higher than the minimized bid cost of $6,050. If the Pay-at-MCP formulation of the invention is used, the minimized costs and the actual costs are equal ($9,300) and lower than the purchase cost obtained from a Pay-as-Offer formulation (a savings of $7,000).

EXAMPLE 3

In this example the Pay-at-MCP/ALSO method is shown to be applicable to a medium sized problem with significant savings being achieved when compared to the Pay-as-offer formulation but with settlements made using the MCP.

There are 25 participants and the planning horizon is 24 hours with each participant submitting the same offer over the time span. The total supply capacity is 4,620 MW. The system demand, which is different for each hour over the planning horizon, is given in Table 5 and ranges from low to high values. Four nuclear plants with low offer prices (between $30/MW and $37/MW) but with very high startup costs contribute 1,305 MW of the supply capacity. Four base load plants with offer prices between $40/MW and $47/MW but with startup costs lower than those for the nuclear plants contribute 1,110 MW of the supply capacity. Eleven of the offers are from cycling plants, which make up 1,590 MW of the total supply capacity and have prices between $55/MW and $70/MW. Six of the offers are from gas turbines, which make up 615 MW of the total supply capacity. Three of the gas turbines have prices between $75/MW and $80MW and relatively high startup costs while the other three have very high prices between $90/MW and $95/MW but relatively low startup costs. Assume that initially all the nuclear and the base load units are on and operating at their minimum generation levels. The supply offer parameters are given in Table 6. FIG. 1 shows the plot of the hourly MCPs over the time horizon obtained under the Pay-as-offer and the ALSO algorithms while Table 8 gives a summary of the purchase costs obtained under the different algorithms.

TABLE 6

System Demand Parameters for Example 3

| HOUR | SYSTEM DEMAND |
|---|---|
| 1 | 2500 |
| 2 | 2550 |
| 3 | 2570 |
| 4 | 2530 |
| 5 | 2650 |
| 6 | 2700 |
| 7 | 2680 |
| 8 | 2740 |
| 9 | 2850 |
| 10 | 2900 |
| 11 | 3500 |
| 12 | 3700 |
| 13 | 3800 |
| 14 | 3900 |
| 15 | 4200 |
| 16 | 4250 |
| 17 | 4400 |
| 18 | 4500 |
| 19 | 4100 |
| 20 | 3850 |
| 21 | 3400 |
| 22 | 2700 |
| 23 | 2300 |
| 24 | 2350 |

TABLE 7

Supply Offer Parameters for Example 3

| | HOUR 1–24 | | | |
|---|---|---|---|---|
| SUPPLY OFFERS | MIN MW | MAX MW | $/MW | START UP COST |
| 1 | 100 | 455 | 30 | 1200 |
| 2 | 60 | 350 | 34 | 1150 |
| 3 | 50 | 300 | 35 | 1100 |

TABLE 7-continued

Supply Offer Parameters for Example 3

HOUR 1–24

| SUPPLY OFFERS | MIN MW | MAX MW | $/MW | START UP COST |
|---|---|---|---|---|
| 4 | 30 | 200 | 37 | 1000 |
| 5 | 40 | 350 | 40 | 350 |
| 6 | 40 | 320 | 42 | 350 |
| 7 | 30 | 240 | 45 | 300 |
| 8 | 30 | 200 | 47 | 300 |
| 9 | 20 | 190 | 55 | 180 |
| 10 | 20 | 180 | 57 | 180 |
| 11 | 20 | 170 | 58 | 175 |
| 12 | 20 | 160 | 59 | 160 |
| 13 | 20 | 150 | 60 | 250 |
| 14 | 20 | 140 | 62 | 200 |
| 15 | 20 | 130 | 63 | 150 |
| 16 | 20 | 125 | 65 | 180 |
| 17 | 20 | 120 | 66 | 140 |
| 18 | 20 | 115 | 68 | 140 |
| 19 | 20 | 110 | 70 | 160 |
| 20 | 20 | 120 | 75 | 250 |
| 21 | 20 | 115 | 78 | 250 |
| 22 | 20 | 110 | 80 | 300 |
| 23 | 20 | 100 | 90 | 50 |
| 24 | 15 | 90 | 93 | 50 |
| 25 | 10 | 80 | 95 | 40 |

TABLE 8

Summary of purchase costs for Example 3

| METHOD | TOTAL PAY-AS-OFFER COST | TOTAL ACTUAL (MCP) COST |
|---|---|---|
| PAY-AS-OFFER | $3,411,193 | $5,345,541 |
| PAY-AT-MCP/ALSO | NOT APPLICABLE | $5,126,769 |
| SAVINGS | | $218,773 |

Table 7 shows that for this example of $218,773 representing a 4.10% savings over the purchase costs associated with the Pay-as-offer formulation. Energy costs per year in the U.S. run in the tens of billions of dollars annually in existing ISO markets, therefore, even a 0.1% savings per year represents significant savings of potentially tens of millions of dollars annually.

With reference to FIG. 1, the MCPs under the Pay-at-MCP formulation are usually less than the MCPs under the Pay-as-offer formulation. This observation is generally true and translates into lower actual purchase costs under the Pay-at-MCP formulation compared to the costs under the Pay-as-offer formulation as can be seen from Tables 4, 5, and 8.

Further Embodiments

For simplicity of illustration, the above presented the basic ideas of the present invention with vertical demand, no ancillary services, and no transmission network constraints. In many cases, an ISO accepts both supply offers and demand bids, and runs auctions for energy and ancillary services to determine the MCPs for each product. The total procurement cost for consumers includes the amount paid for energy and ancillary services, together with compensation of start-up and no load costs. Further embodiments are presented next for diversified ISO operation environments, including the new formulations and corresponding methodologies to consider demand bids, the simultaneous optimal auctions of energy and ancillary services, and different ways for compensating start-up and no-load costs. Additionally, new formulations and corresponding methodologies are presented to consider transmission network constraints using AC power flow analysis and DC power flow analysis.

Demand Bids, Capacity Compensation, and Ancillary Services

This embodiment presents a new formulation and the corresponding solution methodology for an ISO that accepts both supply offers and demand bids (including energy amount and the associated prices), performs simultaneous auctions for both energy and ancillary services, and does not provide full compensation for capacity related costs (e.g., start-up and no-load costs). The formulation includes energy balance constraints, compensation cost function, ancillary service constraints, MCP-offer/purchase constraints, and the objective function.

Problem Formulation

Energy Balance Constraints

If the demand is not fixed a priori but determined through bids and the auction process, the previous system demand constraints of Eq. (2) need to be replaced by the following energy balance constraints stating that the total energy from all selected offers should equal the total demands from selected bids at any time. That is, $$\sum_{i=1}^{I} P_i^E(t) - \sum_{m=1}^{M} P_m^D(t) = 0, \text{ for } t \text{ from } 1 \text{ to } T, \quad (A.1)$$

where $P_i^E(t)$ is the energy selected for offer i at hour t, and $P_m^D(t)$ the energy awarded to bid m at hour t.

Compensation Cost Function

The previous MCP formulation Eq. (6) is good if an ISO makes full compensation for start-up and no-load costs. For some ISOs (e.g., ISO-PJM and ISO-NE), however, compensation is determined by comparing an offer's requested amounts (including applicable start-up and no-load costs) with the revenue generated through MCPs for the day. If the requested amount is less than the revenue generated through MCPs, then no compensation will be made. Only when the requested amount exceeds the revenue generated through MCPs, the difference serves as the compensation term. The following compensation cost function is thus established to model this situation, i.e., $$\tilde{S}_i = \max\{0, G_i - M_i\}, \quad (A.2)$$

where $\tilde{S}_i$ is capacity compensation for offer i, and $G_i$ and $M_i$ are, respectively, the requested amount and revenue generated through MCPs. Mathematically, $$G_i \equiv \sum_{t=1}^{T} [C_i^E(P_i^E(t), t) + C_i^R(P_i^R(t), t) + C_i^S(P_i^S(t), t) + C_i^N(P_i^N(t), t) + S_i^{NL}(t) + S_i(t)], \quad (A.3)$$

where $P_i^E(t)$, $P_i^R(t)$, $P_i^S(t)$, and $P_i^N(t)$ are, respectively, selected energy, regulation, spinning reserve, and non-spinning reserve prices for offer i at hour t; $C_i^E(P_i^E(t),t)$, $C_i^R(P_i^R(t),t)$, $C_i^S(P_i^S(t),t)$ and $C_i^N(P_i^N(t),t)$ are the corresponding cost curves; and $S_i^{NL}(t)$ and $S_i(t)$ are, respectively, no-load and applicable start-up costs of offer i at hour t. In addition, $$M_i \equiv \sum_{t=1}^{T} [MCP^E(t)P_i^E(t) + MCP^R(t)P_i^R(t) + MCP^S(t)P_i^S(t) + MCP^N(t)P_i^N(t)], \quad (A.4)$$

where $MCP^E(t)$, $MCP^R(t)$, $MCP^S(t)$, and $MCP^N(t)$ are, respectively, market clearing prices for energy, regulation, spinning reserve, and non-spinning reserve markets.

Regulation, Spinning Reserve, and Non-Spinning Reserve Constraints

System regulation requires that the total regulation provided by all the selected offers should be greater than or equal to the required regulation amount $P^R(t)$ for hour t, i.e., $$\sum_{i=1}^{I} P_i^R(t) \geq P^R(t), \text{ for } t \text{ from } 1 \text{ to } T, \quad (A.3)$$

where $P_i^R(t)$ is the selected regulation for offer i at time t. Similarly, system spinning reserve requirements are:

$$\sum_{i=1}^{I} P_i^S(t) \geq P^S(t), \text{ for } t \text{ from } 1 \text{ to } T, \quad (A.4)$$

where $P^S(t)$ is system spinning reserve requirement at hour t, and $P_i^S(t)$ is the selected spinning reserve for offer i at time t. System non-spinning reserve requirements are:

$$\sum_{i=1}^{I} P_i^N(t) \geq P^N(t), \text{ for } t \text{ from } 1 \text{ to } T, \quad (A.5)$$

where $P^N(t)$ is system non-spinning reserve requirement at hour t, and $P_i^N(t)$ is the selected regulation for offer i at time t.

MCP-Offer Constraints

In view of the existence of ancillary services, the previous MCP offer constraints Eq. (8) and Eq. (9) are extended to the following:

$$O_i^{Er}(p_i(t), t) \equiv \begin{cases} O_i^E(p_i^E(t), t), & p_i^E(t) > 0, \\ 0, & p_i^E(t) = 0, \end{cases} \quad (A.6a)$$

$$g_i^E(t) \equiv O_i^{Er}(p_i(t), t) - MCP^E(t) \leq 0 \forall i \text{ and } t; \quad (A.6)$$

$$O_i^{Rr}(p_i(t), t) \equiv \begin{cases} O_i^R(p_i^R(t), t), & p_i^R(t) > 0, \\ 0, & p_i^R(t) = 0, \end{cases} \quad (A.7a)$$

$$g_i^R(t) \equiv O_i^{Rr}(p_i(t), t) - MCP^R(t) \leq 0 \forall i \text{ and } t; \quad (A.7)$$

$$O_i^{Sr}(p_i(t), t) \equiv \begin{cases} O_i^S(p_i^S(t), t), & p_i^S(t) > 0, \\ 0, & p_i^S(t) = 0, \end{cases} \quad (A.8a)$$

$$g_i^S(t) \equiv O_i^{Sr}(p_i(t), t) - MCP^S(t) \leq 0 \forall i \text{ and } t; \quad (A.8)$$

-continued $$O_i^{Nr}(p_i(t), t) \equiv \begin{cases} O_i^N(p_i^N(t), t), & p_i^N(t) > 0, \\ 0, & p_i^N(t) = 0, \end{cases} \quad (A.9a)$$

$$g_i^N(t) \equiv O_i^{Nr}(p_i(t), t) - MCP^N(t) \leq 0 \forall i \text{ and } t. \quad (A.9)$$

In the above, $O_i^E(P_i^E(t),t)$, $O_i^R(P_i^R(t),t)$, $O_i^S(P_i^S(t),t)$, $O_i^N(P_i^N(t),t)$ are, respectively, the offer prices for energy, regulation, spinning reserve, and non-spinning reserve of generation unit i at hour t.

$MCP^E$-Purchase Constraints

If a demand bid is selected to receive energy, its bidding price cannot be less than the MCPs. Therefore, $MCP^E$-Purchase constraints act as the mirror images to Eq. (A.7a) and Eq. (A.7):

$$B_m^r(p_m^D(t), t) \equiv \begin{cases} B_m(p_m^D(t), t), & p_m^D(t) > 0, \\ -1, & p_m^D(t) = 0, \end{cases} \quad (A.10a)$$

$$g_m^D(t) \equiv MCP^E(t - B_m^r(P_m^D(T), t) \leq 0 \forall i \text{ and } t, \quad (A.10)$$

where $B_m^D(t)$ is the selected energy for bid m at hour t, and $B_m(P_m^D(t),t)$ the corresponding bidding price.

Objective Function

The ISO's objective is to minimize the total purchasing costs. When ancillary services are considered, the total cost consists of two components: costs paid to offers through MCPs and the compensation of capacity related costs. Therefore the objective function to be minimized is:

$$J \equiv \sum_{i=1}^{I} \left( \sum_{t=1}^{T} (MCP^E(t)P_i^E(t) + MCP^R(t)P_i^R(t) + MCP^S(t)P_i^S(t) + MCP^N(t)P_i^N(t)) + \tilde{S}_i \right) \quad (A.11)$$

Compared to the previous embodiment of the objective function Eq. (6), this formulation has more decision variables, i.e., $\{MCP^E(t)\}$, $\{MCP^R(t)\}$, $\{MCP^S(t)\}$, $\{MCP^N(t)\}$, $\{P_i^E(t)\}$, $\{P_i^R(t)\}$, $\{P_i^S(t)\}$, $\{P_i^N(t)\}$. The compensation term $\tilde{S}_i$ also involves MCPs of energy and ancillary services, and decisions of all selected services of offer i.

Solution Methodology

Augmented Lagrangian

The structure of this new formulation is similar to the previous embodiment of the MCP problem. Therefore, this new problem can be similarly solved by using an augmented Lagrangian relaxation and surrogate optimization framework. Coupling constraints (Eqs. (A.1) (A.3) (A.4) (A.5) (A.6) (A.7) (A.8) (A.9) (A.10)) are first relaxed, and the augmented Lagrangian is formed in Eq. (A.12) of FIG. 6. Subproblems are then established under the surrogate optimization framework. In view of the presence of demand bids and ancillary service markets, new purchasing subproblems and ancillary service MCP subproblems exist. These subproblems are formed and solved as follows.

Offer Sub-Problems

Similar to the previous derivations, sub-problem for offer i is formed by pulling out all the terms related to offer i's decisions, i.e., $\{P_i^E(t)\}$, $\{P_i^R(t)\}$, $\{P_i^S(t)\}$, and $\{P_i^N(t)\}$, from (A.12):

$$\min_{\{P_i^E, P_i^R, P_i^S, P_i^N\}} L_i, \text{ with} \quad (A.13)$$

$$L_i \equiv \sum_{t=1}^{T} \{MCP^E(t)P_i^E(t) + MCP^R(t)P_i^R(t) +$$

$$MCP^S(t)P_i^S(t) + MCP^N(t)P_i^N(t)\} + \tilde{S}_i +$$

$$\sum_{t=1}^{T} \left\{ \lambda^E(t)P_i^E(t) - \lambda^R(t)P_i^R(t) - \lambda^S(t)P_i^S(t) - \lambda^N(t)P_i^N(t) + \right.$$

$$\frac{c}{2}\left[P_i^E(t)^2 + 2P_i^E(t)\left(\sum_{j=1,j\neq i}^{I} P_j^E(t) - \sum_{m=1}^{M} P_m^D(t)\right)\right] +$$

$$\frac{1}{2c}(\max\{0, \eta_i^E(t) + c[O_i^E(P_i^E(t), t) - MCP^E(t)]\})^2 +$$

$$\frac{1}{2c}(\max\{0, \eta_i^R(t) + c[O_i^R(P_i^R(t), t) - MCP^R(t)]\})^2 +$$

$$\frac{1}{2c}(\max\{0, \eta_i^S(t) + c[O_i^S(P_i^S(t), t) - MCP^S(t)]\})^2 +$$

$$\left.\frac{1}{2c}(\max\{0, \eta_i^N(t) + c[O_i^N(P_i^N(t), t) - MCP^N(t)]\})^2 \right\}.$$

The maximization operation within Eq. (A.2) makes the compensation term $\tilde{S}_i$ couple across the time horizon, consequently, Eq. (A.13) can no longer be decomposed into individual time units (hours) for dynamic programming to be effective. One way to overcome this difficulty is to replace $\tilde{S}_i$ by an equivalent expression in terms of two inequality constraints $$\tilde{S}_i \geq 0, \text{ and} \quad (A.14)$$

$$\tilde{S}_i \geq D_i, \quad (A.16)$$

$$D_i \equiv \sum_{t=1}^{T} \{[((C_i^E(P_i^E(t)) + C_i^R(P_i^R(t)) + C_i^S(P_i^S(t)) + V_i^N(P_i^N(t))) + \quad (A.16)$$

$$\psi_i(t)S_i^{NL} + S_i(t)] - [MCP^E(t)P_i^E(t) + MCP^R(t)P_i^R(t) +$$

$$MCP^S(t)P_i^S(t) + MCP^N(t)P_i^N(t))]\}.$$

Backward dynamic programming (BDP) can then be used to solve offer sub-problems.

Demand Purchase Sub-Problems

The purchase sub-problem for demand bid m is formed as a mirror image of an offer sub-problem by pulling out all terms related to decisions of bid m, i.e., $\{P_m^D(t)\}$, as $$\min_{\{P_m^D\}} L_m, \text{ with } L_m \equiv \sum_{t=1}^{T}\left\{-\lambda(t)P_m^D(t) + \right. \quad (A.17)$$

-continued $$\frac{c}{2}\left(P_m^D(t)^2 - 2P_m^D(t)\left(\sum_{i=1}^{I} P_i^E(t) - \sum_{\substack{l=1\\l\neq m}}^{M} P_l^D(t)\right)\right) +$$

$$\left.\frac{1}{2c}(\max\{0, \eta_m^D(t) + c[MCP^E(t) - B_m(P_m^D(t), t)]\})^2\right\}.$$

MCP Sub-Problems

For the new problem, MCPs for energy and ancillary services need to be determined simultaneously. Therefore, $MCP^E$, $MCP^R$, $MCP^S$, and $MCP^N$ sub-problems are formed.

$MCP^E$ Sub-Problems

Similar to the previous problem Eq. (6), $MCP^E$ subproblems are formed for iteratively adjusting MCPs. The $MCP^E(t)$ subproblem takes the form as:

$$\min_{MCP^E(t)} L_{MCP^E(t)}, \text{ with } L_{MCP^E(t)} \equiv \sum_{i=1}^{I} \left\{ MCP^E(t)P_i^E(t) + \right. \quad (A.18)$$

$$\left.\frac{1}{2c}\{(\max\{0, \eta_i^E(t) + c[O_i^E(P_i^E(t), t) - MCP^E(t)]\})^2\}\right\} +$$

$$\frac{1}{2c}\sum_{m=1}^{M}\{(\max\{0, \eta_m^D(t) + c[MCP^E(t) - B_m(P_m^D(t), t)]\})^2\},$$

for $t$ from 1 to $T$.

$MCP^R$, $MCP^S$ and $MCP^N$ Sub-Problems

Similarly, $MCP^R(t)$, $MCP^S(t)$, and $MCP^N(t)$ subproblem are formed as follows:

$$\min_{MCP^R(t)} L_{MCP^R(t)}, \text{ with } L_{MCP^R(t)} \equiv \sum_{i=1}^{I} \left\{ MCP^R(t)P_i^R(t) + \right. \quad (A.19)$$

$$\left.\frac{1}{2c}\{(\max\{0, \eta_i^R(t) + c[O_i^R(P_i^R(t), t) - MCP^R(t)]\})^2\}\right\},$$

for $t$ from 1 to $T$;

$$\min_{MCP^S(t)} L_{MCP^S(t)}, \text{ with } L_{MCP^S(t)} \equiv \sum_{i=1}^{I} \left\{ MCP^S(t)P_i^S(t) + \right. \quad (A.20)$$

$$\left.\frac{1}{2c}\{(\max\{0, \eta_i^S(t) + c[O_i^S(P_i^S(t), t) - MCP^S(t)]\})^2\}\right\};$$

$$\min_{MCP^N(t)} L_{MCP^N(t)}, \text{ with } L_{MCP^N(t)} \equiv \sum_{i=1}^{I} \left\{ MCP^N(t)P_i^N(t) + \right. \quad (A.21)$$

$$\left.\frac{1}{2c}\{(\max\{0, \eta_i^N(t) + c[O_i^N(P_i^N(t), t) - MCP^N(t)]\})^2\}\right\}.$$

Updating Multipliers

Similar to the previous section, multipliers will be updated using either the Multiplier Method or the Subgradient Method, with subgradients in the formulas replaced by surrogate subgradients. The formulas for the Multiplier Method are:

$$\lambda^E(t)^{k+1} = \lambda^E(t)^k + c^k\left(\sum_{m=1}^{M} P_m^D(t) - \sum_{i=1}^{I} P_i^E(t)\right); \quad (A.22)$$

-continued $$\lambda^R(t)^{k+1} = \lambda^R(t)^k + c^k \left( P^R(t) - \sum_{i=1}^{I} P_i^R(t) \right);\quad\quad (A.23)$$

$$\lambda^S(t)^{k+1} = \lambda^S(t)^k + c^k \left( P^S(t) - \sum_{i=1}^{I} P_i^S(t) \right);\quad\quad (A.24)$$

$$\lambda^N(t)^{k+1} = \lambda^N(t)^k + c^k \left( P^N(t) - \sum_{i=1}^{I} P_i^N(t) \right);\quad\quad (A.25)$$

$$\eta_i^E(t)^{k+1} = \eta_i^E(t)^k + c^k [O_i^E(P_i^E(t), t) - MCP^E(t)];\quad\quad (A.26)$$

$$\eta_i^R(t)^{k+1} = \eta_i^R(t)^k + c^k [O_i^R(P_i^R(t), t) - MCP^R(t)];\quad\quad (A.27)$$

$$\eta_i^S(t)^{k+1} = \eta_i^S(t)^k + c^k [O_i^S(P_i^S(t), t) - MCP^S(t)];\quad\quad (A.28)$$

$$\eta_i^N(t)^{k+1} = \eta_i^N(t)^k + c^k [O_i^N(P_i^N(t), t) - MCP^N(t)].\quad\quad (A.29)$$

$$\eta_m^D(t)^{k+1} = \eta_m^D(t)^k + c^k [MCP^E(t) - b_m(P_m^D(t), t)];\quad\quad (A.30)$$

Penalty coefficient c is updated by the following formula with γ being a positive constant:

$$c^{k+1} = \begin{cases} \xi c^k & \text{if } \left\| \sum_{m=1}^{M} P_m^D(t)^{k+1} - \sum_{i=1}^{I} P_i^E(t)^{k+1} \right\| > \gamma \left\| \sum_{m=1}^{M} P_i^E(t)^k - \sum_{i=1}^{I} P_i^E(t)^k \right\|, \\ c^k & \text{otherwise.} \end{cases}\quad (A.31)$$

Also with Transmission Constraints

The next two embodiments incorporate the effects of transmission networks to capture the requirements of Standard Market Design and to ensure stable and secure operations. When congestion in transmission networks is considered, the MCPs may depend on the location, and are therefore referred to as Locational Marginal Prices (LMPs). In order to determine the congestion in transmission networks, AC or DC power flow equations are solved. If the result shows that the limit of a transmission line would be exceeded, then sensitivity coefficients are used to form a branch flow inequality constraint for that line. Such inequality constraints are then passed as additional constraints to be relaxed in ALSO to avoid violation for future iterations. For simplicity of presentation, system demand is assumed given with no import or export power, ancillary services are not considered, and capacity related costs are fully compensated.

Review of AC Power Flow By the Newton Raphson Method

AC power flow models the nonlinear relationships between bus power injections and bus voltages and phase angles, and has been extensively used in system planning to forecast the effects of contingencies. Consider a transmission line connecting two buses i and j in a transmission network. Assume that the transmission line is long and can be represented by a π model. The parameters of the transmission line and the buses are given by:

$y_{sij}$=Series admittance of line i-j.
$y_{pij}$=Shunt admittance.
$|V_i|$ and $|V_j|$: Voltage magnitudes at bus i and bus j, respectively.
$P_i^G$=Active power generated at bus i.
$P_i^L$=Active power demanded at bus i.
$Q_i^G$=Reactive power generated at bus i.
$Q_i^L$=Reactive power demanded at bus i.
$P_i^{net}=P_i^G-P_i^L$=Net injected active power at bus i.
$Q_i^{net}=Q_i^G-Q_i^L$=Net injected reactive power at bus i
$\delta_i$ and $\delta_j$: Phase angles of bus i and bus j, respectively.
Y=Bus admittance matrix of the transmission network,
I=Column vector of injected bus currents of the transmission network.
V=Column vector of injected bus voltages of the transmission network.

The voltages at bus i and bus j are given by $V_i=|V_i|\angle\delta_i$ and $V_j=|V_j|\angle\delta_j$, respectively. It can be shown that:

$$I = Y \cdot V,\quad\quad (B.1)$$

where, $$Y_{ij} = |Y_{ij}|\angle\theta_{ij} = G_{ij} + jB_{ij}, \text{ with}\quad\quad (B.2)$$

$$Y_{ii} = \sum_j (y_{sij} + y_{pij}), \text{ and}\quad\quad (B.3)$$

$$Y_{ij} = -y_{sij} \text{ for } i \neq j.\quad\quad (B.4)$$

The injected current at node i is given by:

$$I_i = \sum_{j=1}^{N} Y_{ij} V_j.\quad\quad (B.5)$$

The complex power at bus i is given by:

$$S_i = V_i I_i^* = P_i^{net} + j Q_i^{net}.\quad\quad (B.6)$$

Substituting $I_i$ from (B.5) into (B.6) yields $$S_i = V_i \sum_{j=1}^{N} V_j^* Y_{ij}^*\quad\quad (B.7a)$$

$$= \sum_{j=1}^{N} |V_i||V_j||Y_{ij}|\angle(\delta_i - \delta_j - \theta_{ij}), \text{ or equivalently}$$

$$S_i = \sum_{j=1}^{N} |V_i||V_j|e^{j(\delta_i-\delta_j)}(G_{ij} - jB_{ij}).\quad\quad (B.7b)$$

Furthermore, $$P_i^{net} = \sum_{j=1}^{N} |V_i||V_j||Y_{ij}|\cos(\delta_i - \delta_j - \theta_{ij}), \text{ or equivalently}\quad (B.8a)$$

$$P_i^{net} = \sum_{j=1}^{N} |V_i||V_j|[G_{ij}\cos(\delta_i - \delta_j) + B_{ij}\sin(\delta_i - \delta_j)]; \text{ and}\quad (B.8b)$$

$$Q_i^{net} = \sum_{j=1}^{N} |V_i||V_j||Y_{ij}|\sin(\delta_i - \delta_j - \theta_{ij}), \text{ or equivalently}\quad (B.9a)$$

$$Q_i^{net} = \sum_{j=1}^{N} |V_i||V_j|[G_{ij}\sin(\delta_i - \delta_j) - B_{ij}\cos(\delta_i - \delta_j)]\quad (B.9b)$$

In general each bus has four variables associated with it, i.e., $|V|$, $\delta$, $P^{net}$, and $Q^{net}$. For notational simplicity, $P_i^{net}$ and $Q_i^{net}$ will be denoted as $P_i$ and $Q_i$, respectively. For a system with N buses, there are a total of 4N variables with 2N constraints given by Eqs. (B.8a)/(B.8b) and Eqs. (B.9a)/(B.9b). To have a unique solution, 2N variables have to be pre-specified. Based on the variables that are pre-specified, buses can be classified into three categories as shown in Table B.1.

TABLE B.1

Bus Classifications

| Bus Classification | Pre-specified Variables | Unknown Variables |
|---|---|---|
| Slack/Reference/Swing (usually bus 1) | $|V|$, $\delta$ | P, Q |
| Voltage Controlled/PV (usually generator buses) | $|V|$, P | $\delta$, Q |
| Load/PQ (load buses) | P, Q | $|V|$, $\delta$ |

Newton Raphson Method for Power Flow

With bus 1 as the reference bus, let bus m, m=2, . . . , M+1 be generator buses and bus k, k=M+2, . . . , N be load buses. The power flow problem is then to find the unspecified $\{|V_k|, \delta_k, \delta_m\}$ given $(|V_1|, \delta_1)$, $\{P_m, |V_m|\}$, and $\{P_k, Q_k\}$ (if all $\{|V|, \delta\}$ are obtained, then $\{P, Q\}$ can be calculated from Eqs. (B.8a)/(B.8b) and Eqs. (B.9a)/(B.9b).

In view that Eqs. (B.8a)/(B.8b) and Eqs. (B.9a)/(B.9b) are nonlinear and no closed-form solution exists, the Newton Raphson algorithm is used to obtain a solution through iterative linearization. The first step is to use initial estimates of $\{|V|, \delta\}$ to compute the net power injections $\{P_i(|V|, \delta), Q_i(|V|, \delta)\}$ using Eqs. (B.8a)/(B.8b) and Eqs. (B.9a)/(B.9b), and calculate the power mismatches (specified value−computed value):

$$\Delta P(\delta,|V|)=[P_2-P_2(\delta,|V|), \ldots, P_n-P_n(\delta,|V|)]^T, \quad (B.10)$$

$$\Delta Q(\delta,|V|)=[Q_m-Q_m(\delta,|V|), \ldots, Q_N-Q_N(X)]^T. \quad (B.11)$$

Through linearization, the error or correction vector ($\Delta\delta$, $\Delta|V|$) is obtained by solving the following linear equations:

$$\begin{bmatrix} J_{11} & J_{12} \\ J_{21} & J_{22} \end{bmatrix} \begin{bmatrix} \Delta\delta \\ \Delta|V| \end{bmatrix} = \begin{bmatrix} \Delta P \\ \Delta Q \end{bmatrix}, \quad (B.12)$$

where $J_{11}$ is a matrix of $\partial P(X)/\partial \delta$, $J_{12}$ is a matrix of $\partial P(X)/\partial |V|$, $J_{21}$ is a matrix of $\partial Q(X)/\partial \delta$, and $J_{22}$ is a matrix of $\partial Q(X)/\partial |V|$. The variables $\delta$ and $|V|$ are then updated as $$\delta^{k+1}=\delta^k+\Delta\delta, \quad (B.13)$$

$$|V|^{k+1}=|V|^k+\Delta|V|. \quad (B.14)$$

The updated values are used in Eqs. (B.8a)/(B.8b) and Eqs. (B.9a)/(B.9b) to compute $\{P^{K+1}, Q^{K+1}\}$, and the process repeats until the norm of the error vector is less than a specified tolerance. Finally, line flows can be calculated. To compute the line losses, let $P_{ij}$ be the flow in the transmission line from bus i to j and $P_{ji}$ the power flow in the reverse direction. In the absence of losses $P_{ij}$ should be equal to negative $P_{ji}$ and $(P_{ij}+P_{ji})$ equals zero. The loss in line ij is thus given by the absolute value of $(P_{ij}+P_{ji})$. The sum of the losses in all the lines gives the total loss in the transmission network.

Branch Flow Inequality Constraints

From line flows obtained above, the transmission lines whose thermal limits would be violated could be identified. To eliminate these possible violations, linear inequality constraints related to these lines are established based on sensitivity analysis, and are passed to ALSO to ensure that they are not violated in the next iteration of ALSO. Linear sensitivity coefficients give the change in line flows as generator MW output at the various buses are varied, and can be expressed as the following partial derivatives:

$$\text{sensitivity} = \frac{\partial MWflow_{ij}}{\partial MW_{gk}}. \quad (B.15)$$

To see how the sensitivity coefficients are obtained and how branch flow inequality constraints are formed, we start with Taylor series expansion of Eq. (B.9) around a nominal point:

$$\Delta P_i = \sum_j \frac{\partial P_i}{\partial |V_j|} \Delta |V_j| + \sum_j \frac{\partial P_i}{\partial \delta_j} \Delta \delta_j. \quad (B.16)$$

The above can be expressed in matrix form as follows:

$$\Delta P=[J_{px}]\Delta x, \quad (B.17)$$

where $J_{px}$ is the appropriate Jacobian, and $\Delta x$ is the vector of variational terms $\Delta|V|$ and $\Delta\delta$. We therefore have:

$$\Delta x=[J_{px}]^{-1}\Delta P. \quad (B.18)$$

Similarly, the MW flow in a transmission line between bus i and j, $P_{ij}$, is a function of $\{|V|, \delta\}$. Let w be the column vector of MW flows on lines whose thermal limits would be violated, i.e., $$w=[MWflow_{ij}], \quad (B.19)$$

then by using Taylor series expansion, the following relationship can be obtained:

$$\Delta w=[J_{wx}]\Delta x, \quad (B.20)$$

where $J_{wx}$ is the appropriate Jacobian. Substituting Eq. (B.18) into Eq. (B.20), we have:

$$\Delta w=([J_{wx}][J_{px}]^{-1})\Delta P. \quad (B.21)$$

The sensitivity coefficient, $\Delta w/\Delta P$, is therefore obtained as $[J_{wx}][J_{px}]^{-1}$.

To establish branch flow inequality constraints, we start with the following:

$$MWflow_{ij} \leq MWflow_{ij}^{max}, \quad (B.22)$$

where $MWflow_{ij}^{max}$ is the thermal limit for the line between bus i and bus j whose thermal limits would be violated. By using a first order Taylor series expansion around the nominal line flow $MWflow_{ij}^0$ and Eq. (B.21), the following is obtained:

$$MWflow_{ij} = MWflow_{ij}^0 + \sum_p \left(\frac{\partial MWflow_{ij}}{\partial P}\right)\Delta P \leq MWflow_{ij}^{max}. \quad (B.23)$$

By using $\Delta P = P - P^0$, we get:

$$\sum_p \left(\frac{\partial MWflow_{ij}}{\partial P}\right) P \leq \quad \text{(B.24)}$$

$$MWflow_{ij}^{max} - \left(MWflow_{ij}^0 - \sum_p \left(\frac{\partial MWflow_{ij}}{\partial P}\right) P^0\right),$$

which can be represented as:

$$\sum_k a_{ij,k} p_k \leq D_{ij}, \quad \text{(B.25)}$$

where $a_{ij,k}$ is the sensitivity coefficients of line i-j with respect to injected power at bus k, $p_k$, and $$D_{ij} = MWflow_{ij}^{max} - \left(MWflow_{ij}^0 - \sum_k \left(\frac{\partial MWflow_{ij}}{\partial p_k}\right) p_k^0\right). \quad \text{(B.26)}$$

Formulation of the Auction Problem with Transmission Constraints

Consider a transmission network with N buses, n=1, ..., N, each having $M_n$ generators, m=1, ..., $M_n$. Generator m of bus n has startup cost $S_{nm}$. Bus 1 is the reference bus and others are load or generator buses. For simplicity but without loss of generality, it is assumed that there is no import or export power. In the absence of thermal limits and transmission losses, generators should be dispatched based on ALSO results, and energy prices at various buses shall be the same (the MCP). However, thermal limits or transmission losses may necessitate the dispatch of a more expensive generator rather than a less expensive alternative. In this case the prices at different buses will be different to reflect congestion effects, and are called the locational marginal price (LMP), l, the price to serve the next MW of energy at that bus. In general, generators are compensated at the bus while load serving entities pay based on the average LMP of a group of buses in an area called a zone.

To formulate the auction problem, the injected power at a bus is the sum of power generated by the generators at that bus, i.e., $$p_n(t) = \sum_{m=1}^{M_n} p_{nm}(t). \quad \text{(B.27)}$$

System demand constraints require that the total load requirements plus transmission losses should equal the total power generated, i.e., $$h_1(p) = P_{load}(t) + P_{losses}(t) - p_1(t) - \sum_{n=2}^{N} p_n(t) = 0, \quad \text{(B.28)}$$

for all t, where $P_{load}$ is the total load/system demand, $P_{losses}$ the total power loss in the network, and $P_n$ the total generation at bus n. Note that in Eq. (B.28), the injected power at bus 1 is separated from those of other buses because the power generated at the reference bus is not an independent variable, but depends on the losses in the system, i.e., $$h_2(p) = P_{losses}(t) - p_1(t) = 0. \quad \text{(B.29)}$$

The branch flow inequality constraints are given by (repeating from (B.25)):

$$g(p) = \sum_n a_{ij,n} p_n - D_{ij} \leq 0. \quad \text{(B.30)}$$

It is assumed for simplicity that generators at a bus determine the LMP at that bus and define the LMP as the maximum offer price of selected offers at a bus, i.e., $$LMP_n = (t) = \max\{O_{nm}(p_{nm}(t),t), \forall\, m=1, \ldots, M_n, \text{ such that } p_{nm}(t) > 0\}. \quad \text{(B.31)}$$

Finally, the objective of the ISO is to minimize the total cost of purchasing power, which is the sum of power purchase costs at different buses, i.e., $$\min J, \text{ with } J \equiv \quad \text{(B.32)}$$

$$\sum_{t=1}^{T} \left\{ \sum_{n=1}^{N} LMP_n(t) \cdot p_n(t) + LMP_1(t) \cdot p_1(t) + \sum_{n=1}^{N} \sum_{m=1}^{M_n} S_{nm}(t) \right\}.$$

Similar to Eq. (B.28), the LMP and injected power at bus 1 are separated from those of the other buses.

LMP-Offer Inequality Constraints

To solve Eq. (B.31), the Augmented Lagrangian relaxation and surrogate optimization (ALSO) framework may be used. The process starts with re-defining offer curves as in Eq. (8):

$$O_{nm}^r(p_{nm}(t), t) \equiv \begin{cases} O_{nm}(p_{nm}(t), t), & p_{nm}(t) > 0, \\ 0, & p_{nm}(t) = 0. \end{cases} \quad \text{(B.33)}$$

LMP-Offer inequality constraints can thus be formed relating the LMP at each bus to the offer curves at that bus, i.e., $$LMP_n(t) \geq O_{nm}^r(p_{nm}(t),t) \forall\, n, m \text{ and } t, \text{ or equivalently,} \quad \text{(B.34)}$$

$$g_{nm}(t) \equiv O_{nm}^r(p_{nm}(t),t) - LMP_n(t) \leq 0. \quad \text{(B.35)}$$

The above inequality constraints couple the LMP at a bus with the offers at that bus and will be relaxed by using Lagrange multipliers.

Augmented Lagrangian Relaxation

When augmented Lagrangian relaxation is applied to Eq. (B.32) subject to Eqs. (B.28), (B.29), (B.30) and (B.35), we have:

$$L_c(\lambda, \eta, \mu, p, LMP) \equiv \quad \text{(B.36)}$$

-continued $$\sum_{t=1}^{T}\left\{\sum_{n=2}^{N}LMP_n(t)\cdot p_n(t)+LMP_1(t)\cdot p_1(t)+\sum_{n=1}^{N}\sum_{m=1}^{M_n}S_{nm}(t)\right\}+$$

$$\sum_{t=1}^{T}\left\{\lambda(t)\left(P_{load}(t)+P_{losses}(t)-p_1(t)-\sum_{n=2}^{N}p_n(t)\right)+\right.$$

$$\pi(t)(P_{losses}(t)-p_1(t))\right\}+$$

$$\sum_{t=1}^{T}\left\{0.5\left\|P_{load}(t)+P_{losses}(t)-p_1(t)-\sum_{n=2}^{N}p_n(t)\right\|^2+\right.$$

$$\left. 0.5c\|P_{losses}(t)-p_1(t)\|^2\right\}+$$

$$\sum_{t=1}^{T}\sum_{ij=1}^{L}\left(\left[\max\left\{0,\eta_{ij}(t)+c\left(\sum_{c}a_{ij,n}p_n-D_{ij}\right)\right\}\right]^2-\right.$$

$$\left.\eta_{ij}(t)^2\right)/2c,$$

$$+\sum_{t=1}^{T}\sum_{n=1}^{N}\sum_{m=1}^{M_n}([\max\{0,\mu_{nm}(t)+c(O^r_{nm}(p_{nm}(t),t)-LMP_n(t))\}]^2-$$

$$\mu_{nm}(t)^2)/2c,$$

where L is the number of overloaded lines. By substituting Eq. (B.27) into Eq. (B.36), we obtain:

$$L_c(\lambda,\eta,\mu,p,LMP)\equiv \qquad (B.37)$$

$$\sum_{t=1}^{T}\left\{\sum_{n=2}^{N}LMP_n(t)\cdot \sum_{m=1}^{M_n}p_{nm}(t)+LMP_1(t)\cdot \sum_{m=1}^{M_1}p_{1m}(t)+\right.$$

$$\left.\sum_{n=1}^{N}\sum_{m=1}^{M_n}S_{nm}(t)\right\}+$$

$$\sum_{t=1}^{T}\left\{\lambda(t)\left(P_{load}(t)+P_{losses}(t)-\sum_{m=1}^{M_1}p_{1m}(t)-\sum_{n=2}^{N}\sum_{m=1}^{M_n}p_{nm}(t)\right)+\right.$$

$$\pi(t)\left(P_{losses}(t)-\sum_{m=1}^{M_1}p_{1m}(t)\right)\right\}+$$

$$\sum_{t=1}^{T}\left\{0.5\left\|P_{load}(t)+P_{losses}(t)-\sum_{m=1}^{M_1}p_{1m}(t)-\sum_{n=2}^{N}\sum_{m=1}^{M_n}p_{nm}(t)\right\|^2+\right.$$

$$\left.0.5c\left\|P_{losses}(t)-\sum_{m=1}^{M_1}p_{1m}(t)\right\|^2\right\}+$$

$$\sum_{i=1}^{T}\sum_{ij=1}^{L}\left(\left[\max\left\{0,\eta_{ij}(t)+c\left(\sum_{n}a_{ij,n}\sum_{m=1}^{M_n}p_{nm}(t)-D_{ij}\right)\right\}\right]^2-\right.$$

$$\left.\eta_{ij}(t)^2\right)/2c+$$

$$\sum_{t=1}^{T}\sum_{n=1}^{N}\sum_{m=1}^{M_n}([\max\{0,\mu_{nm}(t)+c(O^r_{nm}(p_{nm}(t),t)-LMP_n(t))\}]^2-$$

$$\mu_{nm}(t)^2)/2c.$$

Offer Subproblems

The subproblem for a supply offer at buses n=2, ..., N, is formed from (B.37) by pulling out all terms related to that offer, i.e., $$\min_{\{p_{nm}(t)\}} L_{nm}, \text{ with } L_{nm}\equiv \qquad (B.38)$$

$$\sum_{t=1}^{T}\{(LMP_n(t)-\lambda(t))p_{nm}(t)+S_{nm}(t)\}+\sum_{t=1}^{T}0.5c\left(p_{nm}(t)^2-\right.$$

$$\left.2p_{nm}(t)\left(P_{load}(t)+P_{losses}(t)-\sum_{a=1,a\neq n}^{N}\sum_{b=1b,\neq m}^{M_n}p_{ab}(T)\right)\right)+$$

$$\sum_{i=1}^{T}\sum_{ij=1}^{L}\left(\left[\max\left\{0,\eta_{ij}(t)+c\left(\sum_{n}a_{ij,n}\sum_{m=1}^{M_n}p_{nm}(t)-D_{ij}\right)\right\}\right]^2-\right.$$

$$\left.\eta_{ij}(t)^2\right)/2c+$$

$$\sum_{t=1}^{T}([\max\{0,\mu_{1m}(t)+c(O^r_{1m}(p_{1m}(t),t)-LMP_1(t))\}]^2-$$

$$\mu_{1m}(t)^2)/2c$$

In Eq. (B.37), $\{p_{nm}(t)\}$ are the decision variables to be optimized whilst all other variables are taken at their latest available values. The solution process is similar to that of ALSO without transmission constraints.

The subproblem for supply offers related to bus 1 is similarly formed from (B.37) by pulling out all terms related to that offer, i.e., $$\min_{\{p_{1m}(t)\}} L_{1m}, \text{ with } L_{1m}\equiv \qquad (B.39)$$

$$\sum_{t=1}^{T}\{(LMP_1(t)-\lambda(t)-\pi(t))p_{1m}(t)+S_{1m}(t)\}+\sum_{t=1}^{T}0.5c\left(p_{1m}(t)^2-\right.$$

$$\left.2p_{1m}(t)\left(P_{load}(t)+P_{losses}(t)-\sum_{a=2,b=1,b\neq m}^{N}\sum_{m=1}^{M_n}p_{ab}(t)\right)\right)+$$

$$\sum_{t=1}^{T}0.5c\left(p_{1m}(t)^2-2p_{1m}(t)\left(P_{losses}(t)-\sum_{b=1,b\neq m}^{M_1}p_{1b}(t)\right)\right)+$$

$$\sum_{t=1}^{T}\sum_{ij=1}^{L}\left(\left[\max\left\{0,\eta_{ij}(t)+c\left(\sum_{1}a_{ij,1}\sum_{m=1}^{M_1}p_{1m}(t)-D_{ij}\right)\right\}\right]^2-\right.$$

$$\left.\eta_{ij}(t)^2\right)/2c+$$

-continued $$\sum_{t=1}^{T}([\max\{0, \mu_{1m}(t) + c(O_{1m}^r(p_{1m}(t), t) - LMP_1(t))\}]^2 -$$

$$\mu_{1m}(t)^2)/2c$$

LMP Subproblems

The LMP subproblem for bus n at hour t is formed from Eq. (B.37) by pulling out all terms related to the $LMP_n(t)$, i.e., $$\min_{LMP_n(t)} L_{LMP_n(t)}, \text{ with } L_{LMP_n(t)} \equiv \left(\sum_{m=1}^{M_n} p_{nm}(t)\right) LMP_n(t) + \qquad (B.40)$$

$$\sum_{t=1}^{T}\sum_{n=1}^{N}\sum_{m=1}^{M_n}([\max\{0, \mu_{nm}(t) + c(O_{nm}^r(p_{nm}(t), t) - LMP_n(t))\}]^2 -$$

$$\mu_{nm}(t)^2)/2c.$$

$LMP_n$ is optimized in Eq. (B.40), while all other variables are kept at their latest available values. The solution process is similar to that of ALSO without transmission constraints.

Update of Multipliers

The surrogate subgradient component of $L_c$ with respect to the system demand multiplier $\lambda(t)$ at time t is obtained from Eq. (B.36) as:

$$S_\lambda(t) = P_{load}(t) + P_{losses}(t) - \sum_{m=1}^{M_1} p_{1m}(t) - \sum_{n=2}^{N}\sum_{m=1}^{M_n} p_{nm}(t). \qquad (B.39)$$

The surrogate subgradient component of $L_c$ with respect to the overloaded line branch flow constraint at time t is given by:

$$S_{\eta_{ij}}(t) = \sum_n a_{ij,n} \sum_{m=1}^{M_n} p_{nm}(t) - D_{ij}. \qquad (B.40)$$

Similarly, the surrogate subgradient component of $L_c$ with respect to the LMP-offer multiplier constraint at time t is given by:

$$S_{\mu_{nm}}(t) = O_{nm}^r(p_{nm}(t),t) - LMP_n(t). \qquad (B.41)$$

The multipliers will be updated by using either the Multiplier Method or the Subgradient Method, with subgradients in the formulas replaced by surrogate subgradients. The formulas for the Multiplier Method are:

$$\lambda^{k+1}(t) = \lambda^k(t) + c^k S_\lambda(t), \qquad (B.42)$$

$$\eta_{ij}^{k+1}(t) = \max(0, \eta_{ij}^k(t) + c^k S_{\eta_{ij}}(t)) \qquad (B.43)$$

$$\mu_{nm}^{k+1}(t) = \max(0, \mu_{nm}^k(t) + c^k S_{\mu_{nm}}(t)) \qquad (B.44)$$

Figure 4:
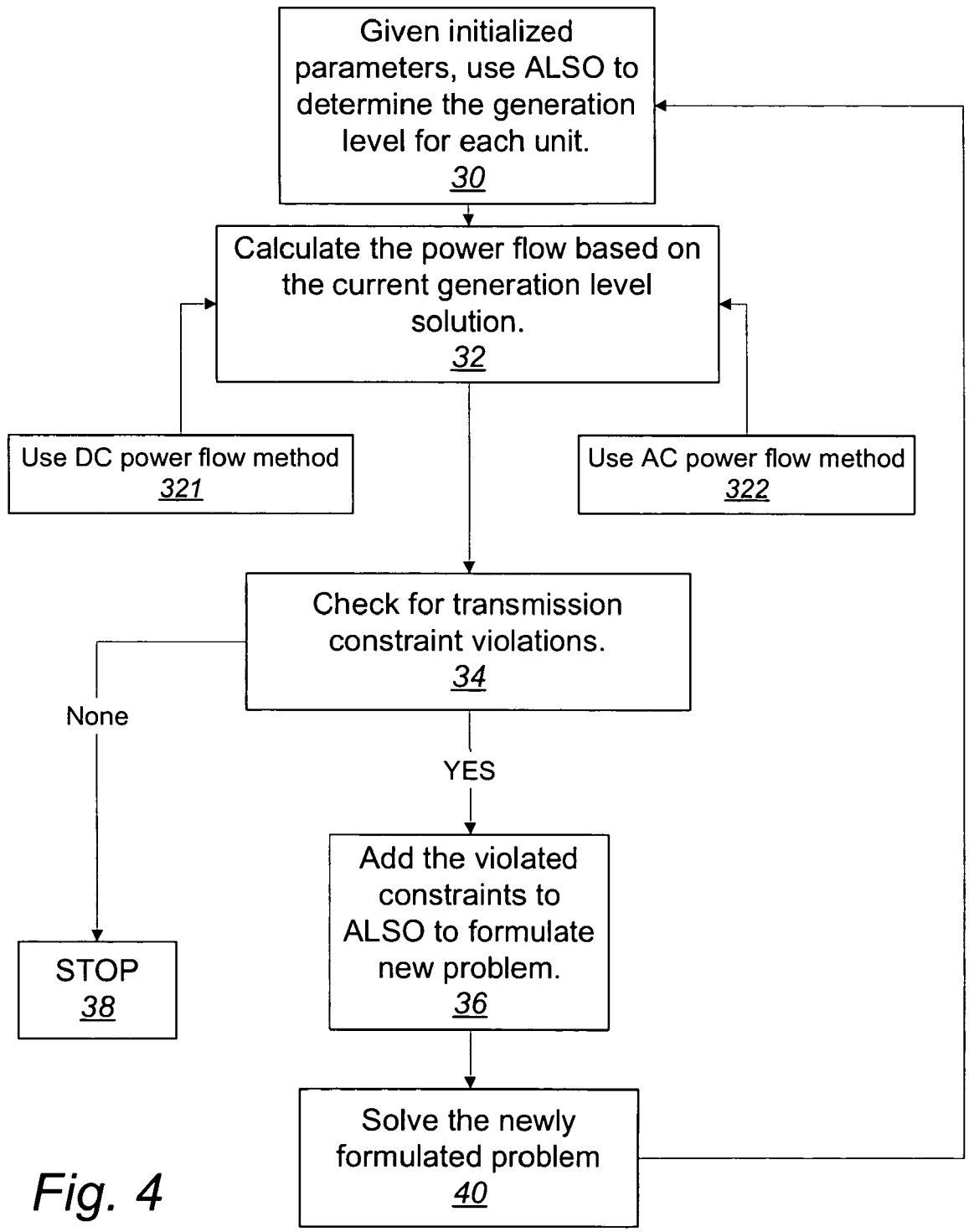
FIG. 4 is a flow diagram of an embodiment of the method of the invention incorporating transmission constraints.

With reference to FIG. 4, the pseudo code for ALSO with transmission constraints is as follows:

Step 30. Given a set of generators at different buses, use ALSO to determine the generation level for each generator.

Step 32. Calculate the power flow based on the current generation level solution using the DC power flow method 321.

Step 34. Check for transmission constraint violations.
  If branch flow limits have been exceeded go to Step 36, if not, go to Step 38.

Step 36. Add the violated constraints as inequality branch flow constraints to ALSO to formulate new problem, and go to Step 40.

Step 38. Stop.

Step 40. Use ALSO to solve the newly formulated problem, and go back to Step 30.

Transmission Constraints Using DC Power Flow Analysis

The ALSO method with transmission constraints was presented in the previous section using the AC power flow analysis. In this section, a similar method is developed by using the DC power flow analysis for fast results and online applications. In the following, the DC power flow analysis is briefly reviewed and then embedded within ALSO similar to what was done in the previous section.

Review of DC Power Flow Analysis

The DC power flow analysis is to solve the power flow problem with a simplified model given the system topology, transmission parameters, and generation and load distribution. As known in the art with reference to this disclosure, the analysis applies the following simplifying approximations to the AC power flow model: Transmission lines have no resistance, the variations of phase angles of bus voltages are small, and the magnitudes of bus voltages are constant. With these assumptions, the reactive power of a transmission line is negligible and the active power is a linear function of phase angles of bus voltages:

$$P_{ij} = \frac{(\delta_i - \delta_j)}{X_{ij}}, \text{ for all } i \text{ and } j, \qquad (C.1)$$

where $P_{ij}$ is the active power from bus i to bus j; $\delta_i$ and $\delta_j$ are the voltage phase angles at bus i and bus j, respectively; and $X_{ij}$ is the reactance of the transmission line between i and j. The energy balance constraints require:

$$P_i^{net} = P_i - P_i^L = \sum_j^1 P_{ij}, \text{ for all } i, \qquad (C.2)$$

where $P_i^{net}$ is the net output power, $P_i$ the total generation at bus i, and $P_i^L$ the load at bus i.

Given $P_i$, $P_i^L$ and $X_{ij}$, power flow $\{P_{ij}\}$ can be obtained by solving linear equations Eq. (C.1) and Eq. (C.2). For notational simplicity, these equations are re-written in the following matrix forms:

$$P_{TR} = A\delta, \qquad (C.3)$$

$$P^{net} = \sum_j^1 \frac{(\delta_i - \delta_j)}{X_{ij}} = B\delta, \qquad (C.4)$$

where $P_{TR}$ is the $N^T \times 1$ column vector of power flow ($N^T$ is the number of transmission lines); $P^{net}$ is an $(N-1) \times 1$ column vector of net output power at each bus (N is the number of buses); δ is $(N-1) \times 1$ column vector of bus voltage angles with regard to the reference bus; and A and B matrices of appropriate dimensions determined by the topology of the network and reactance of transmission lines. With A, B and $P^{net}$ given, power flow $P_{TR}$ can be calculated as:

$$P_{TR} = AB^{-1}P^{net}. \quad (C.5)$$

Formulation of Transmission Constraints
Power flow should not exceed their upper limits, i.e., $$AB^{-1}P^{net} \leq P^{max}, \quad (C.6)$$

where $P^{max}$ is a given $N^T \times 1$ column vector of transmission limits. A set of linear inequality transmission constraints can therefore be established from Eq. (C.6) by checking the violation or near violation of transmission limits.

ALSO with Transmission Constraints

With reference to FIG. 4, similar to the previous method using the AC power flow analysis, relevant transmission constraints are incorporated within ALSO as follows:

Step 30. Given a set of generators at different buses, use ALSO to determine the generation level for each generator.

Step 32. Calculate the power flow based on the current generation level solution using the AC power flow method 322.

Step 34. Check for transmission constraint violations.
   If branch flow limits have been exceeded go to Step 36, if not, go to Step 38.

Step 36. Add the violated constraints as inequality branch flow constraints to ALSO to formulate new problem, and go to Step 40.

Step 38. Stop.

Step 40. Use ALSO to solve the newly formulated problem, and go back to Step 30.

Standard Processing System Upon which the Present Invention may be Implemented

Figure 5:
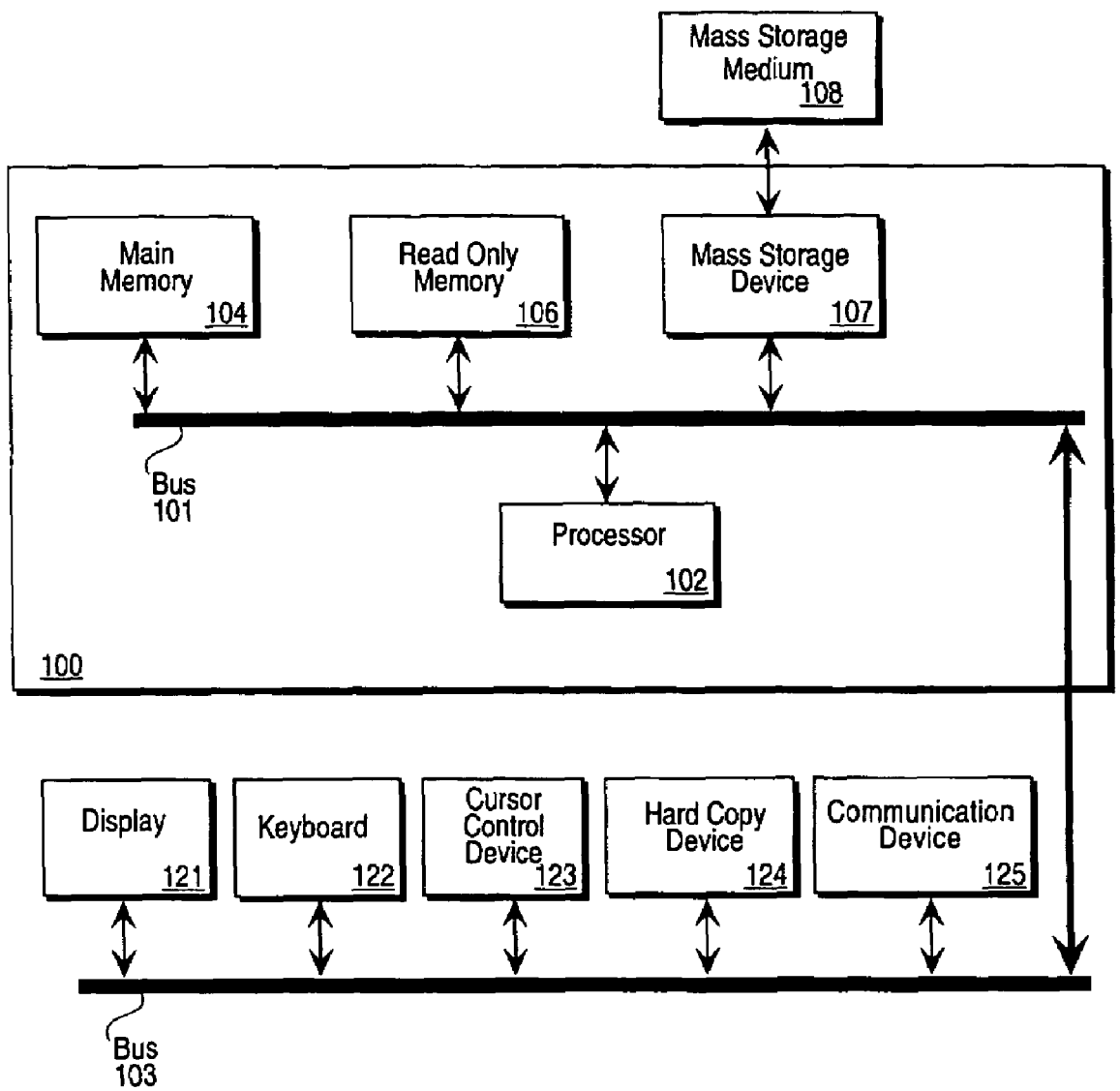
FIG. 5 illustrates a typical data processing system upon which one embodiment of the present invention is implemented.

FIG. 5 illustrates a typical data processing system upon which one embodiment of the present invention may be implemented. It will be apparent to those of ordinary skill in the art, however, that other alternative systems of various system architectures may also be used. The data processing system illustrated in FIG. 5 includes a bus or other internal communication means 101 for communicating information, and a processor 102 coupled to the bus 101 for processing information. The system further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a mass storage device 107 such as a magnetic disk drive or optical disk drive. Mass storage device 107 is coupled to bus 101 and is typically used with a computer readable mass storage medium 108, such as a magnetic or optical disk, for storage of information and program instructions.

The system may further be coupled to a display device 121, such as a cathode ray tube (CRT) or a liquid crystal display (LCD) coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control 123, such as a mouse, a trackball, stylus, or cursor direction keys coupled to bus 101 through bus 103 for communicating direction information and command selections to processor 102, and for controlling cursor movement on display device 121. Another device, which may optionally be coupled to bus 101 through bus 103, is a hard copy device 124 which may be used for printing instructions, data, or other information on a medium such as paper, film, or similar types of media.

A communication device 125 can be coupled to bus 101 through bus 103 for use in accessing other nodes of a network computer system or other computer peripherals. This communication device 125 may include any of a number of commercially available networking peripheral devices such as those used for coupling to an Ethernet, token ring, Internet, or wide area network. It may also include any number of commercially available peripheral devices designed to communicate with remote computer peripherals such as scanners, terminals, specialized printers, or audio input/output devices. Communication device 125 may also include an RS232 or other conventional serial port, a conventional parallel port, a small computer system interface (SCSI) port or other data communication means. Communications device 125 may use a wireless means of data transfer devices such as the infrared IRDA protocol, spread-spectrum, or wireless LAN. In addition, communication device 125 is used in the preferred embodiment to couple the mobile playback device 212 to the client computer system 214 as described in more detail below.

Note that any or all of the components of the system illustrated in FIG. 5 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 5 is an IBM® compatible personal computer (PC), an Apple Macintosh® personal computer, or a SUN® SPARC Workstation. Processor may be one of the 80×86 compatible microprocessors such as the 80486 or PENTIUM® brand microprocessors manufactured by INTEL® Corporation of Santa Clara, Calif.

The software implementing the present invention can be stored in main memory 104, mass storage device 107, or other storage medium accessible to processor 102. It will be apparent to those of ordinary skill in the art that the methods and processes described herein can be implemented as software stored in main memory 104 or read only memory 106 and executed by processor 102. This software may also be resident on an article of manufacture comprising a computer usable mass storage medium 108 having computer readable program code embodied therein and being readable by the mass storage device 107 and for causing the processor to perform digital information transactions and protocols in accordance with the teachings herein.

The method of the present invention may be implemented using the C++ programming language. Suitable C++ programming software includes: Borland C++ Builder 6.0 Professional and Microsoft Visual C++6.0 Professional.

Although the present invention has been described in considerable detail with reference to certain preferred versions thereof, other versions are possible. Other auctions such as the treasury bill markets, which use a model similar to the one being used by the ISOs, could adopt this new method for improved efficiency. The successfully resolution of the inseparable Pay-at-MCP problem using the ALSO algorithm further opens the door for the application of the Lagrangian relaxation approach to many semi-separable integer or mixed integer optimization problems. Therefore, the scope of the appended claims should not be limited to the description of the preferred versions contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Also, any element in a claim that does not explicitly state "means for" performing a specified function or "step for" performing a specified function, should not be interpreted as a "means" or "step" clause as specified in 35 U.S.C. § 112.

We claim:

1. A system for determining an electricity market clearing price, subject to a plurality of constraints and an actual purchase cost, comprising:
    a data processing system in communication with a mass storage device;
    the mass storage device tangibly embodying program instructions that when executed by the data processing system perform the method steps of:
        encoding an objective function relating the electricity market clearing price and plurality of constraints in terms of a nonlinear programming expression;
        forming a Lagrangian dual function from the objective function;
        resolving the Lagrangian dual function using a surrogate optimization framework and the actual purchase cost; and
        determining the market price as a function of the resolved Lagrangian dual function where the encoded objective function is:

$$J \equiv \sum_{t=1}^{T} \sum_{i=1}^{I} \{MCP(t)p_i(t) + S_i(t)\}$$

and MCP(t) is the electricity market clearing price during time t, $p_i(t)$ is the amount purchased from a supplier i during a time t, and $S_i(t)$ is the capacity related cost of the supplier i during the time t.

2. A program storage device readable by a machine, tangibly embodying a program of instructions executable by the machine to perform method steps for determining an electricity market clearing price, subject to a plurality of constraints and an actual purchase cost, said method steps comprising:
    encoding an objective function relating the electricity market clearing price and plurality of constraints in terms of a nonlinear programming expression;
    forming a Lagrangian dual function from the objective function;
    resolving the Lagrangian dual function using a surrogate optimization framework and the actual purchase cost; and
    determining the market price as a function of the resolved Lagrangian dual function where the encoded objective function is:

$$J \equiv \sum_{t=1}^{T} \sum_{i=1}^{I} \{MCP(t)p_i(t) + S_i(t)\}$$

and MCP(t) is the electricity market clearing price during time t, $p_i(t)$ is the amount purchased from a supplier i during a time t, and $S_i(t)$ is the capacity related cost of the supplier i during the time t.

3. The article of claim 2, where the plurality of constraints comprise transmission network constraints.

4. The article of claim 2, where the forming of a Lagrangian dual function comprises applying Lagrangian relaxation to the nonlinear programming expression; and the surrogate optimization framework comprises repeating, until stopping criteria are satisfied, the steps of:
    forming one or more supply sub-problems and a market price sub-problem;
    optimizing the market price sub-problem while keeping all other variables at their latest available values;
    optimizing at least one of the one or more supply sub-problems; and
    updating multipliers used to relax constraints.

5. The article of claim 4, where the forming of a Lagrangian dual function further comprises augmenting the Lagrangian dual function with one or more penalty terms.

6. The article of claim 5, where the Lagrangian dual function is:

$$\overline{L}_c(\lambda, \eta_i, p_i, MCP) \equiv \sum_{t=1}^{T} \{f(t) + \lambda(t)h(t) + 0.5c\|h(t)\|^2\} + \sum_{i=1}^{I} \left(\eta_i(t)(g_i(t) + z_i^2(t)) + 0.5c\|g_i(t) + z_i^2(t)\|^2\right)$$

where $L_c$ is the Lagrangian dual function, f(t) is the objective function, h(t) is a demand balance constraint at a time t and $\lambda(t)$ is an associated Lagrange multiplier, $p_i$ is a decision variable of a bid i, MCP is the market clearing price, $z_i^2(t)$ is a non-negative slack variable at time t and $\eta_i(t)$ is an associated Lagrange multiplier, $g_i(t)$ is an MOP-bid inequality constraint, and c is a penalty term coefficient.

7. The article of claim 5, where one or more sub-problems are solved by using backward dynamic programming.

8. The article of claim 5, where each of the one or more supply sub-problems being associated with a bid i, where the supply sub-problem for bid i is formed as:

$$\min_{\{p_i(t)\}} L_i, \text{ with } L_i \equiv \sum_{t=1}^{T} \left\{ (MCP(t) - \lambda(t))p_i(t) + S_i(t) + 0.5c \left( p_i(t)^2 - 2p_i(t) \left( P_d(t) - \sum_{j=1, j \neq i}^{I} p_j(t) \right) \right) + \right.$$

-continued $$\frac{[\max\{0, \eta_i(t) + c(O_i^r(p_i(t), t) - MCP(t))\}]^2 - \eta_i(t)^2}{2c}\Bigg\}$$

where $\{p_i(t)\}$ are the decision variables of bid i during a time t, $\{p_j(t)\}_{j \neq i}$ are decision variables of bids other than bid i, $\lambda(t)$ is a multiplier associated with the system demand constraint during time t; MCP(t) is a market clearing price during time t, $O_i^r(p_i(t),t)$ is a redefined bidprice, $\eta_i(t)$ a multiplier associated with MCP-bid inequality constraint during time t; $S_i(t)$ is a capacity related cost of a supplier i during the time t, $P_d(t)$ is a system demand during time t, and c is a penalty term coefficient.

9. The article of claim 5, where the market price sub-problem is associated with a time t, where the market price sub-problem for time t is formed as:

$$\min_{MCP(t)} L_{MCP(t)}, \text{ with } L_{MCP(t)} \equiv$$

$$\left(\sum_{i=1}^{I} p_i(t)\right) MCP(t) + \frac{\sum_{i=1}^{I} [\max\{0, \eta_i(t) + c(O_i^r(p_i(t), t) - MCP(t))\}]^2}{2c}$$

where $p_i(t)$ is a decision variable of a bid i during time t, MCP(t) is the market clearing price during time t, $O_i^r(p_i(t),t)$ is a redefined bid price, $\eta_i(t)$ is a multiplier associated with MCP-bid inequality constraint during time t, and c is a penalty term coefficient.

10. The article of claim 5, where the multipliers are updated based upon either the Surrogate Multiplier Method formulas:

$$\lambda^{k+1}(t) = \lambda^k(t) + c^k S_\lambda$$

and $$\eta_i^{k+1}(t) = \max(0, \eta_i^k(t) + c^k S_{\eta i})$$

or the Surrogate Subgradient Method formulas:

$$\lambda^{k+1}(t) = \lambda^k(t) + \alpha^k S^\lambda$$

and $$\eta_i^{k+1}(t) = \max(0, \eta_i^k(t) + \alpha^k S_{\eta i}(t))$$

where $\alpha^k$ an appropriate step size at an iteration k, $c^k$ is a penalty term coefficient at iteration k, $\lambda^k(t)$ is a multiplier associated with a system demand constraint during a time t at iteration k, $\eta_i^k(t)$ is a multiplier associated with MCP-bid inequality constraint during time t at iteration k, $S_\lambda(t)$ is a component for $\lambda(t)$ of a surrogate subgradient vector, and $S_{\eta i}(t)$ is a component for $\eta_i(t)$ of the surrogate subgradient vector.

11. The article of claim 2, where the encoded objective function is:

$$J \equiv \sum_{i=1}^{I} \left( \sum_{t=1}^{T} (MCP^R(t) P_i^R(t) + MCP^E(t) P_i^E(t) + MCP^S(t) P_i^S(t) + MCP^N(t) P_i^N(t)) + \tilde{S}_i \right)$$

and $MCP^E(t)$, $MCP^R(t)$, $MCP^S(t)$, and $MCP^N(t)$ are, respectively, market clearing prices for energy, regulation, spinning reserve, and non-spinning reserve markets during time t; $P_i^E(t)$, $P_i^R(t)$, $P_i^S(t)$, and $P_i^N(t)$ are respectively selected energy, regulation, spinning reserve, and non-spinning reserve prices for a bid i at an hour t, and $\tilde{S}_i$ is the capacity compensation for the offer i.

12. The article of claim 2, where the surrogate optimization framework comprises repeating, until stopping criteria are satisfied, the steps of:
 forming one or more supply sub-problems, one or more demand sub-problems and a market price sub-problem;
 optimizing the market price sub-problem while keeping all other variables at their latest available values;
 optimizing at least one of the one or more supply sub-problems;
 optimizing at least one of the one or more demand sub-problems; and
 updating multipliers used to relax constraints.

* * * * *